(12) United States Patent
Kastler et al.

(10) Patent No.: US 12,208,518 B2
(45) Date of Patent: Jan. 28, 2025

(54) ARM MODULE, ROBOTIC ARM AND INDUSTRIAL ROBOT

(71) Applicant: Beckhoff Automation GmbH, Verl (DE)

(72) Inventors: Peter Kastler, Vienna (AT); Clemens Maier, Bludenz (AT); Thomas Morscher, Vienna (AT); Armin Pehlivan, Nüziders (AT); Christoph Zech, Mödling (AT)

(73) Assignee: Beckhoff Automation GmbH, Verl (DE)

( * ) Notice: Subject to any disclaimer, the term of this patent is extended or adjusted under 35 U.S.C. 154(b) by 1 day.

(21) Appl. No.: 17/581,382

(22) Filed: Jan. 21, 2022

(65) Prior Publication Data
US 2022/0143815 A1 May 12, 2022

Related U.S. Application Data

(63) Continuation of application No. PCT/EP2020/070974, filed on Jul. 24, 2020.

(30) Foreign Application Priority Data

Jul. 25, 2019 (DE) ...................... 10 2019 120 128.4

(51) Int. Cl.
*B25J 9/08* (2006.01)
*B25J 9/00* (2006.01)
(Continued)

(52) U.S. Cl.
CPC ............... *B25J 9/08* (2013.01); *B25J 9/0009* (2013.01); *B25J 17/00* (2013.01); *B25J 18/00* (2013.01); *B25J 19/0041* (2013.01)

(58) Field of Classification Search
CPC . B25J 15/045; B25J 17/00; B25J 18/00; B25J 19/0041; B25J 19/0045; B25J 9/08
See application file for complete search history.

(56) References Cited

U.S. PATENT DOCUMENTS

| 4,319,772 A | 3/1982 | Weirich et al. |
| 4,370,091 A | 1/1983 | Gagliardi |
| (Continued) | | |

FOREIGN PATENT DOCUMENTS

| CN | 2735363 Y | 10/2005 |
| CN | 101861234 A | 10/2010 |
| (Continued) | | |

OTHER PUBLICATIONS

"EtherCAT—the Ethernet Fieldbus," EtherCAT Technology Group, Nov. 2012, 21 pages.

(Continued)

*Primary Examiner* — Charles A Fox
*Assistant Examiner* — Gregory T Prather
(74) *Attorney, Agent, or Firm* — Dorsey & Whitney LLP

(57) ABSTRACT

An arm module, modular robot arm or industrial robot has a housing with first and second connection sides. The first connection side has a first connection plate, a first fluid contact device and a first contact device. The second connection side is mechanically connected to the housing in a torque-proof manner, and has a second connection plate. The first fluid contact device and first contact device are arranged on the first connection plate, parallel to a mounting axis. The first connection side is connectable to another arm module. An external thread is arranged about the first mounting axis, on an outer circumferential side of the first connection plate. The second connection plate is circumferentially embraced by a fastening ring with an internal thread corresponding to the external thread. The fastening ring is connected to the (Continued)

housing in an axially fixed manner, rotatable about a second mounting axis.

20 Claims, 18 Drawing Sheets

(51) Int. Cl.
  *B25J 17/00* (2006.01)
  *B25J 18/00* (2006.01)
  *B25J 19/00* (2006.01)

(56) References Cited

U.S. PATENT DOCUMENTS

| | | | |
|---|---|---|---|
| 4,438,309 A | 3/1984 | Zimmer | |
| 4,655,655 A * | 4/1987 | Schurfeld | B23B 29/046 |
| | | | 403/380 |
| 4,990,839 A | 2/1991 | Schonlau | |
| 5,039,193 A | 8/1991 | Snow et al. | |
| 5,056,829 A | 10/1991 | Kramer | |
| 5,069,524 A | 12/1991 | Watanabe et al. | |
| 5,205,701 A | 4/1993 | Kigami et al. | |
| 5,488,215 A | 1/1996 | Aronsson | |
| 5,633,963 A | 5/1997 | Rickenbach et al. | |
| 5,850,762 A | 12/1998 | Kochanneck | |
| 6,084,373 A | 7/2000 | Goldenberg et al. | |
| 6,628,338 B1 | 9/2003 | Elberbaum et al. | |
| 8,786,385 B1 | 7/2014 | Lorenc | |
| 8,845,338 B2 | 9/2014 | Sirkett et al. | |
| 8,909,008 B1 | 12/2014 | Tzeng et al. | |
| 8,978,509 B2 | 3/2015 | Pan et al. | |
| 9,677,602 B1 | 6/2017 | Baghdasarian | |
| 9,751,220 B2 | 9/2017 | Murphy et al. | |
| 9,796,097 B2 | 10/2017 | Kirihara | |
| 10,281,657 B2 | 5/2019 | Sullivan | |
| 10,343,277 B2 | 7/2019 | Gombert et al. | |
| 10,780,575 B2 | 9/2020 | Reese et al. | |
| 10,821,613 B2 | 11/2020 | Yoshimura et al. | |
| 11,413,761 B2 * | 8/2022 | Simkins | B25J 9/161 |
| 2001/0052735 A1 | 12/2001 | Sakamoto | |
| 2008/0118204 A1 | 5/2008 | Ankerhold | |
| 2010/0314376 A1 | 12/2010 | Zander et al. | |
| 2013/0340560 A1 * | 12/2013 | Burridge | B25J 17/025 |
| | | | 74/490.05 |
| 2014/0245856 A1 | 9/2014 | Kirihara et al. | |
| 2014/0283642 A1 | 9/2014 | Harada et al. | |
| 2016/0046019 A1 | 2/2016 | Ryu et al. | |
| 2016/0195385 A1 * | 7/2016 | Hoeller | G01B 11/2425 |
| | | | 250/208.1 |
| 2017/0341228 A1 | 11/2017 | Ryu et al. | |
| 2018/0079080 A1 | 3/2018 | Kozaki | |
| 2018/0111275 A1 | 4/2018 | Kurek | |
| 2018/0169872 A1 | 6/2018 | Okamoto | |
| 2019/0099883 A1 | 4/2019 | Niu | |
| 2019/0168395 A1 | 6/2019 | Hay et al. | |
| 2020/0269417 A1 | 8/2020 | Riek et al. | |
| 2020/0282553 A1 | 9/2020 | Simkins | |
| 2022/0118634 A1 | 4/2022 | Pfister et al. | |
| 2022/0134539 A1 | 5/2022 | Kastler et al. | |
| 2022/0134540 A1 | 5/2022 | Kastler et al. | |

FOREIGN PATENT DOCUMENTS

| | | | |
|---|---|---|---|
| CN | 106541398 A | 3/2017 | |
| CN | 107466262 A | 12/2017 | |
| CN | 108858135 A | 11/2018 | |
| DE | 3717597 A1 | 1/1988 | |
| DE | 29912409 U1 | 9/1999 | |
| DE | 102013019869 A1 | 5/2015 | |
| DE | 202014010032 U1 | 3/2016 | |
| DE | 202016104373 U1 | 8/2016 | |
| DE | 102017104319 A1 | 9/2017 | |
| DE | 102017001943 A1 | 8/2018 | |
| DE | 102019120116 A1 | 1/2021 | |
| DE | 102019120131 A1 | 1/2021 | |
| DE | 102019120135 A1 | 1/2021 | |
| EP | 0054454 A1 | 6/1982 | |
| EP | 0221186 A1 | 5/1987 | |
| EP | 0743143 A1 | 11/1996 | |
| EP | 0901877 A2 | 3/1999 | |
| EP | 1123784 A2 | 8/2001 | |
| EP | 3372354 A1 | 9/2018 | |
| EP | 3441205 A2 | 2/2019 | |
| EP | 3476548 A1 | 5/2019 | |
| WO | 9532078 A1 | 11/1995 | |
| WO | 9608675 A1 | 3/1996 | |
| WO | 9901261 A1 | 1/1999 | |
| WO | 9960667 A2 | 11/1999 | |
| WO | 2012136645 A1 | 10/2012 | |
| WO | 2018158097 A1 | 9/2018 | |
| WO | 2019038221 A1 | 2/2019 | |
| WO | 2019081662 A1 | 5/2019 | |
| WO | 2019081662 A9 | 8/2019 | |
| WO | 2021013912 A1 | 1/2021 | |
| WO | 2021013913 A1 | 1/2021 | |
| WO | 2021013994 A1 | 1/2021 | |

OTHER PUBLICATIONS

International Search Report and Written Opinion issued in International Application No. PCT/EP2020/070974, mailed on Nov. 10, 2020, 22 pages including English Translation.

Office Action issued in German Patent Application No. 102019120128.4 issued on Apr. 6, 2020, 11 pages with English translation.

International Search Report and Written Opinion dated Jan. 13, 2021 in connection with International Patent Application No. PCT/EP2020/070755, 27 pages including English translation.

International Search Report and Written Opinion dated Jan. 13, 2021 in connection with International Patent Application No. PCT/EP2020/070972, 35 pages including English translation.

International Preliminary Report on Patentability dated Mar. 4, 2021 in connection with International Patent Application No. PCT/EP2020/070755, 32 pages including English translation.

International Preliminary Report on Patentability dated Jun. 24, 2021 in connection with International Patent Application No. PCT/EP2020/070974, 137 pages including English translation.

International Preliminary Report on Patentability dated Jul. 9, 2021 in connection with International Patent Application No. PCT/EP2020/070754, 24 pages including English translation.

International Preliminary Report on Patentability dated Jul. 27, 2021 in connection with International Patent Application No. PCT/EP2020/070972, 38 pages including English translation.

International Search Report and Written Opinion dated Nov. 5, 2020 in connection with International Patent Application No. PCT/EP2020/070754, 21 pages including English translation.

Office Action dated Dec. 15, 2020 in connection with German patent application No. DE 10 2019 120 116.0, 18 pages including English translation.

Office Action dated Jun. 21, 2022 in connection with Chinese Patent Application No. 202080053862.4, 11 pages Including English translation.

Office Action dated Dec. 28, 2022 in connection with Chinese patent application No. 202080053383.2, 9 pages Including English translation.

Office Action dated Dec. 28, 2022 in connection with Chinese patent application No. 202080054360.3, 9 pages Including English translation.

Office Action dated Jul. 12, 2023 in connection with Chinese patent application No. 202080053383.2, 20 pages Including English translation.

Office Action dated Nov. 11, 2023 in connection with Chinese patent application No. 202080053383.2, 21 pages including English translation.

Office Action dated Feb. 23, 2024 in connection with Chinese patent application No. 202080053383.2, 8 pages including English translation.

"English translation of EP1123784A2" Franz, Aug. 16, 2001), cited Jul. 31, 2024 in copending U.S. Appl. No. 17/575,010.

(56) References Cited

OTHER PUBLICATIONS

"English translation of EP3372354A1," (Valente, Sep. 12, 2018), cited Jul. 31, 2024 in copending U.S. Appl. No. 17/575,010.

* cited by examiner

1

ARM MODULE, ROBOTIC ARM AND INDUSTRIAL ROBOT

CROSS-REFERENCE TO RELATED APPLICATIONS

This patent application is a continuation of International Application PCT/EP2020/070974, ARM MODULE, ROBOTIC ARM AND INDUSTRIAL ROBOT, filed 24 Jul. 2020, which claims the priority of German patent application DE 10 2019 120 128.4, ARMMODUL, ROBOTERARM UND INDUSTRIEROBOTER, filed 25 Jul. 2019, each of which is incorporated by reference herein, in the entirety and for all purposes.

FIELD

The present invention relates to an arm module, to a robot arm accordingly, and to an industrial robot.

BACKGROUND

The technical field of automation technology has the task of automating machines, including industrial robots and/or systems, i.e. to be able to operate them independently and without the involvement of a human being. A degree of automation in an automation system is the higher, the more independent a respective machine of a facility and/or a respective system is/are from human intervention.

Goals of automation technology are a relief of human beings from dangerous, strenuous and/or monotonous activities, an improvement of a quality of the produced goods by the technical system, a higher efficiency of the system and a cost reduction by the system. General advances in machines, signal acquisition, signal processing and/or communication of components within the automation system may, compared to the state of the art, significantly increase the degree of automation of an existing or a new system.

For communication, an automation system has corresponding components that usually communicate with one another in a so-called local area network, which is a spatially limited network in which the various network components are coupled to one another wirelessly, optically, electrically and/or opto-electrically. The network components may be one or a plurality of servers and one or a plurality of workstations, referred to as network elements or topologically speaking: network nodes, which are connected to each other e.g. via radio links, optical fibers, coaxial cables and/or twisted pair cables and may communicate via these.

An automation communication network used in automation technology usually corresponds to a so-called field bus system. A fieldbus system is a bus system in which decentrally arranged components of a machine periphery, such as input modules, output modules, drives, operating terminals, etc., are connected to control units via the fieldbus system. A joint transmission channel, e.g. in the form of the field bus or as a radio link, is available for data transmission. Communication between the network components within the LAN is based on network protocols.

Application-specific industrial robots are an integral part of such automated systems. An industrial robot is a programmable machine for handling, assembling and/or machining workpieces. The industrial robot generally comprises a robot base, a robot arm having a plurality of proximal and distal arm links that may be pivoted and/or rotated relative to one another, an end effector, a local controller/regulator, and possibly a global controller/regulator. Industrial robots are frequently equipped with various sensors. When programmed, the industrial robot is capable of autonomously performing a workflow or varying an execution of a task depending on information from a sensor.

For example, US 2018/0111275 A1 discloses a modular robot arm. The modular robot arm comprises a set of modular robot components that are connected to one another. To connect the modular robot components to one another, a ring section is provided in each case. In this embodiment, high forces act on the connection between the two robot components.

Furthermore, various embodiments of robot arms are disclosed in International Patent Publication WO 2019/081662 A1, U.S. Publication No. 2016/0046019 A1, European Patent Publication EP 0 743 143, International Patent Publication WO 1999/01261 A1, European Patent Publication EP 3 372 354 A1, and U.S. Pat. No. 4,370,091.

SUMMARY

The invention provides an arm module for a robot arm that is particularly quick and easy to assemble. Furthermore the invention provides a robot arm that is particularly easy and flexible to assemble, and an improved industrial robot.

According to one aspect the arm module comprising a first housing, a first connection side, and a second connection side. The first connection side includes a first connection plate, a first fluid contact device, and a first contact device. The second connection side is mechanically connected to the first housing in a torque-proof manner and comprises a second connection plate, wherein the first fluid contact device and the first contact device are arranged on the first connection plate and extend in parallel to a first mounting axis. The first connection side may be mechanically connected to a further arm module of the robot arm, wherein a fluid, in particular compressed air or a hydraulic fluid, may be exchanged with the further arm module via the first fluid contact device and an optical signal and/or an electrical signal may be exchanged with the further arm module via the first contact device for transmitting data. On a first outer circumferential side of the first connection plate, an external thread is arranged circumferentially around the first mounting axis, the second connection plate being embraced circumferentially by a fastening ring and the fastening ring having on an inner circumferential side an internal thread embodied to correspond to the external thread. The fastening ring is connected to a first housing of the arm module in an axially fixed manner and so as to be rotatable about the second mounting axis, wherein a first face gearing is arranged on the first connection plate. The second connection plate has a second face gearing, the first face gearing and the second face gearing being embodied to be complementary and/or corresponding to one another.

According to second aspect an arm module for a modular robot arm of an industrial robot comprises comprising a first housing, a first connection side and a second connection side, wherein the first connection side comprises a first connection plate, and the second connection side is mechanically connected to the first housing in a torque-proof manner and comprises a second connection plate, wherein the first connection side may be connected to a further arm module of the robot arm, wherein the second connection plate is circumferentially embraced by a fastening ring and the fastening ring comprises an inner thread at an inner circumferential side, wherein the fastening ring is connected to a first housing of the arm module so as to be rotatably about the second mounting axis, wherein a first face gearing is arranged at the first connection plate, wherein the second connection plate comprises a second face gearing, wherein the first face gearing and the second face gearing are embodied complementary and/or correspondingly to each other, wherein the first connection side comprises a first fluid contact device, wherein the first fluid contact device is arranged at the first connection plate and extends in parallel to a first mounting axis, wherein a fluid, in particular compressed air or a hydraulic fluid, may be transmitted via the first fluid contact device, wherein an external thread is circumferentially arranged around the first mounting axis on a first outer circumferential side of the first connection plate, wherein the inner thread is embodied so as to correspond to the external thread, wherein the fastening ring is connected to a first housing of the arm module in an axially fixed manner.

EXAMPLES

This embodiment has the advantage that both a fluid connection and the data connection and, in addition, a mechanically durable connection to the further arm module may be established in a single assembly step for connecting the arm module to the further arm module. As a result, the arm module may be assembled with the further active arm module particularly quickly and easily to result in a modular robot arm. In particular, high torques may be transmitted across the first and second face gearing, so that the arm module may be accelerated particularly quickly. Furthermore, the arm module may support a high load, e.g. of an object to be lifted.

Furthermore, the optical signal or electrical signal for transmitting data may be routed on the inside of the arm module and a fluid line and/or data line may be dispensed with on the outside of the arm module. Unintentional damage to the arm module, for example by getting caught and/or snagged on the fluid line and/or data line, is thus reliably prevented.

Furthermore, the arm module may be manufactured particularly quickly and automatically in large series. As a result, the arm module may be manufactured particularly inexpensively for a modular system of a modular robot.

In a further embodiment, the first face gearing and/or the second face gearing can be embodied as a Hirth joint. As a result, the first face gearing and/or the second face gearing is self-centering and automatic centering may be provided when the further arm module is mounted on the first connection side.

In a further embodiment, the second face gearing can be arranged on the inside adjacent to the fastening ring. As a result, the second face gearing may be made particularly slim in the radial direction, so that the overall space requirement of the first and second connection sides is particularly low.

In order to transmit a particularly large torque at the second connection side, the second face gearing can be arranged on the inside adjacent to the fastening ring.

In a further embodiment, the first connection plate and the first face gearing can be formed in one piece and of the same material. As a result, the first connection side may be manufactured in an injection molding process in a particularly cost-effective and mechanically stable manner.

In a further embodiment, the second connection plate and the second face gearing can be formed in one piece and of the same material. As a result, the second connection side may be manufactured in an injection molding process in a particularly inexpensive and mechanically stable manner.

In a further embodiment, the first face gearing can comprise at least a first tooth, the first tooth having a first indentation which extends in the axial direction along the first mounting axis, the second connection side being connected to the first housing in a torque-proof manner by a third fastening, the third fastening projecting beyond the second connection plate, the first indentation being at least in sections embodied corresponding to the third fastening. As a result, the radial installation space requirement of the first and second connection sides may be kept low.

In a further embodiment, the first face gearing can adjoin the first outer circumferential side on the inside in radial direction, with the first fluid contact device being arranged radially between the first power contact device and the first face gearing.

In a further embodiment, the first power contact device can be arranged in radial direction with respect to the first mounting axis between the first contact device and the first fluid contact device, wherein the first fluid contact device is arranged radially outwardly with respect to the first power contact device between the first power contact device and the first outer circumferential side on the first connection plate, wherein a fluid, in particular compressed air or a hydraulic fluid, may be transmitted via the first fluid contact device, an optical signal and/or an electrical signal may be transmitted via the first contact device for transmitting data, and electrical power may be transmitted via the first power contact device for supplying the arm module with electrical energy. This embodiment has the advantage that an ideally compact design of the first connection side may thereby be provided, via which a high fluid flow and a high electrical current may be transmitted. Due to the centered arrangement of the contact device, an unrestricted rotatability of the first connection side may be ensured, accompanied by a high data transmission rate, in particular according to the EtherCAT standard.

In a further embodiment, the second connection side can comprise a second fluid contact device configured to correspond to the first fluid contact device, a second power contact device configured to correspond to the first power contact device, and a second contact device configured to correspond to the first contact device, wherein the second fluid contact device, the second power contact device and the second contact device are arranged on the second connection plate, and the second fluid contact device, the second power contact device and the second contact device extend along a second mounting axis, wherein the first fluid contact device is fluidically connected to the second fluid contact device directly or indirectly in the first housing and the first contact device is data-connected to the second contact device directly or indirectly in the first housing for transmitting the optical and/or electrical signal, wherein the first power contact device and the second power contact device are electrically connected to each other directly or indirectly in the first housing, wherein the first power contact device and the second power contact device are electrically connected to each other, wherein the fluid may be transmitted via the second fluid contact device, the electrical power may be transmitted via the second power contact device, and the optical and/or the electrical signal may be transmitted via the second contact device. As a result, several arm modules may be mounted particularly easily via the first and second connection sides, with fluidic, power-electric and data contacting taking place simultaneously.

In a further embodiment, the first fluid contact device can have a plurality of first fluid contacts arranged at an offset in the circumferential direction with respect to the first mounting axis, the first fluid contacts being arranged concentrically with respect to the first mounting axis and being embodied identically to one another, the first fluid contacts being fluidically separated from one another and/or being at least partially fluidically connected in parallel. This allows different fluids, e.g. with a different pressure level, or a fluid in different directions, or a particularly large mass flow of the fluid to be transmitted via the first connection side.

In a further embodiment, the second fluid contact device can have at least one second fluid contact, the second fluid contact extending in parallel to the second mounting axis, the first fluid contact being connected to the second fluid contact for exchanging of a fluid, the first fluid contact comprising a tube receptacle and the second fluid contact having a tube portion, the tube receptacle and the tube portion being embodied to correspond to one another at least circumferentially. As a result, the first connection side is particularly compact in the axial direction.

In a further embodiment, the arm module can comprise a pin running at a distance from and in parallel to the first mounting axis, the pin being electrically and mechanically connected to the first connection plate and projecting beyond the first connection plate, the pin being embodied to engage in a pin receptacle of the further arm module for coding and/or positioning the arm module with respect to the further arm module and/or the second connection plate having a pin receptacle, the pin receptacle being embodied to correspond to the pin and being set up to receive a pin of a further arm module. In this way, incorrect assembly may be prevented.

In a further embodiment, the arm module can be embodied as an active arm module and has a drive device, the first connection side being mounted rotatably about the first mounting axis and being connected to the drive device in a torque-locking manner, the drive device being embodied to controllably rotate the first connection side about the first mounting axis. The above-described embodiment of the arm module enables the drive device to rotate the first connection side about the first mounting axis in an unlimited manner. Alternatively, the arm module is configured as a passive arm module, wherein the first connection plate is connected to the first housing in a torque-proof manner on a side of the first housing facing away from the second connection side.

In a further embodiment, the first connection side can comprise a hollow shaft, the hollow shaft being torque-locked to an output side of the drive device, the hollow shaft passing through the drive device and a first axial end of the hollow shaft being connected to the first connection plate in a torque-proof manner and a second axial end of the hollow shaft being arranged at a distance from the drive device, at least one fluid channel fluidically connected to the first fluid contact device and at least one electrical data connection connected to the first contact device being arranged in the hollow shaft. As a result, the arm module may be embodied to be particularly compact in the radial direction with respect to the mounting axis.

In a further embodiment an improved robotic arm for an industrial robot may be provided by the robotic arm having at least a first arm module and a second arm module, the first arm module and the second arm module being embodied as described above. The fastening ring of the first arm module is screwed onto the first connection side of the second arm module in such a way that the internal thread of the first arm module and the external thread of the first connection side of the second arm module engage with each other, and the first face gearing of the first connection side and the second face gearing of the second connection side engage with each other. The first connection side of the second arm module is mechanically connected to the second connection side of the first arm module for transmitting support forces and/or drive forces between the first arm module and the second arm module. Via the interconnected first and second connection sides of the first arm module and the second arm module, the fluid for an end effector that may be connected to the robot arm and/or the optical signal and/or the electrical signal for transmitting data and for controlling the two arm modules and/or the end effector may be exchanged. The fastening ring allows the internal thread to be quickly and easily screwed onto the external thread, thereby axially securing the engagement of the end effector teeth with one another. This allows a particularly large torque to be exchanged between the first arm module and the second arm module. This allows the robot arm to move particularly high loads and/or to be moved particularly quickly.

In a further embodiment, the first face gearing and the second face gearing can be embodied relative to each other in such a way that when the first connection side is mounted to the second connection side by sliding the two face gearings in an adjoining manner, the second connection plate is aligned centered with regard to the first mounting axis.

In a further embodiment, the second connection side can have the pin receptacle, the pin receptacle being embodied for orienting and/or coding the second connection side relative to the first connection side and being arranged in the second connection plate, wherein, when the first connection side and the second connection side are mounted adjoining one another, the pin engages in the pin receptacle and preferably electrically connects the first connection plate of the first connection side to the second connection plate to result in a ground contact between the two arm modules. This eliminates the need for an additional ground connection.

In a further embodiment an industrial robot can comprise a robot arm as described above and a robot base, wherein the first connection side of the first arm module faces the robot base, wherein the fluid and/or the optical signal and/or the electrical signal may be transmitted between the first connection side of the first arm module facing the robot base and a second connection side of the second arm module facing away from the robot base via the first connection side of the second arm module.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the drawings illustrate only typical embodiments of this invention and are therefore not to be considered limiting of its scope, and the invention may admit to other equally effective embodiments.

DETAILED DESCRIPTION

Figure 1:
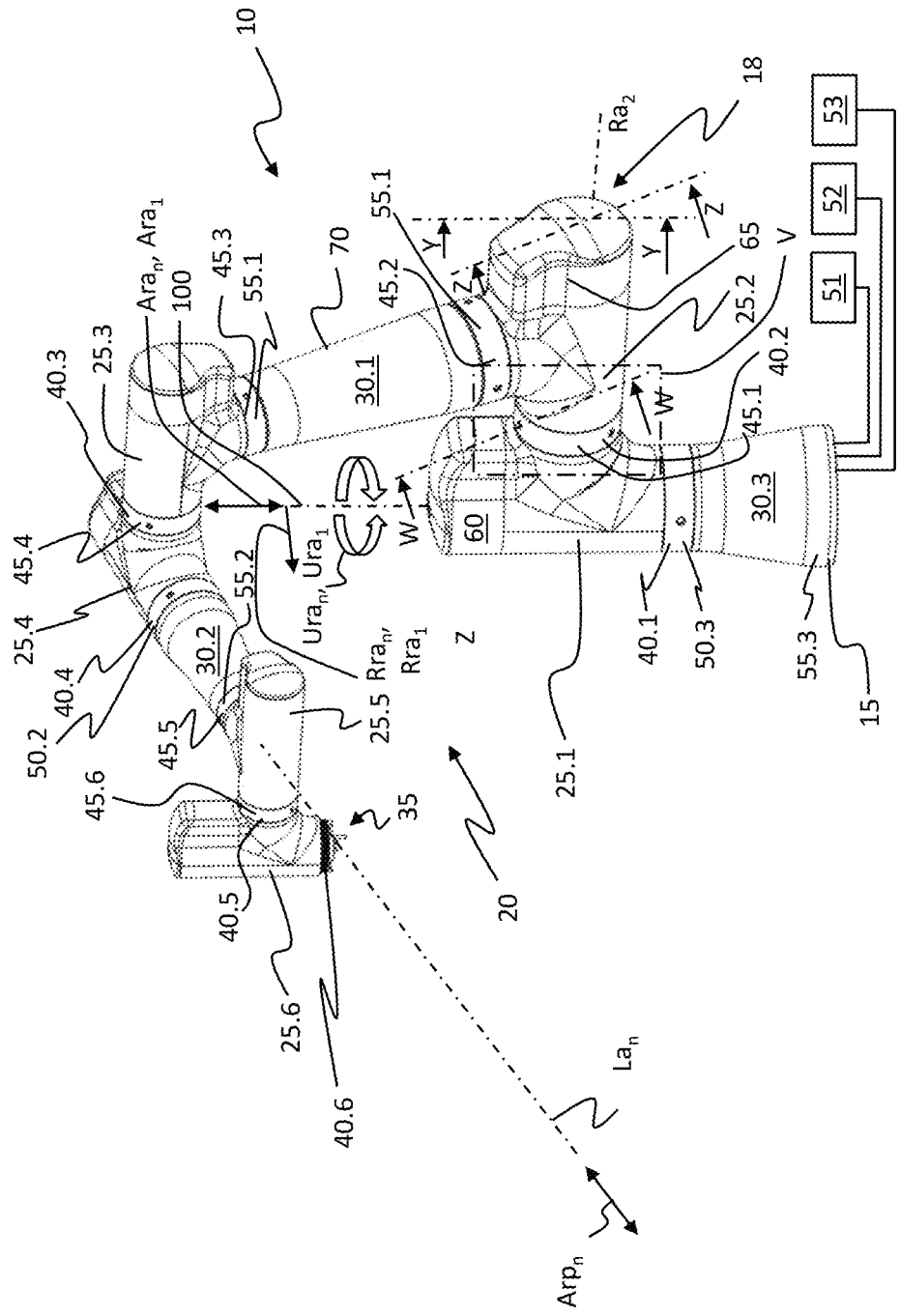
FIG. 1 shows a perspective view of an industrial robot for an automation system according to a first embodiment.

FIG. 1 shows a perspective view of an industrial robot 10 for an automation system.

The industrial robot 10 is an (automatic) machine with several degrees of freedom (in FIG. 1 six exemplary rotational degrees of freedom) for automation technology, which may perform various functions in a working environment in (conditional) autonomous performance by a pre-programmed control/regulation. The industrial robot 10 comprises a robot base 15, a robot arm 20 and a, preferably interchangeable, end effector, also referred to as a robot hand; with, e.g., a tool, a gripper, etc., which is arranged at a free end of the robot arm 20.

In particular, the present robot arm 20 of the industrial robot 10 is modularly embodied from a modular system with a plurality of arm modules 18. The arm modules 18 may be exemplarily constructed as an active arm module 25 or as a passive arm module 30 or as an end effector. The modular system may further comprise other (arm and/or end) modules. In principle, the structure of the robot arm 20 with active arm modules 25 and passive arm modules 30 may be selected as desired and is only limited with regard to a maximum load-bearing capacity of the arm modules 18.

In FIG. 1, the active arm modules 25 are numbered, with numbering starting at the robot base 15 towards the end effector. The passive arm modules 30 are also numbered to help distinguish them. For example, a third passive arm module 30.3 is connected to the robot base 15 at one end and to a first active arm module 25.1 at another end. At its second end, the first active arm module 25.1 is connected to a second active arm module 25.2. A first passive arm module 30.1 is arranged between the second active arm module 25.2 and a third active arm module 25.3. The third active arm module 25.3 is connected to a fourth active arm module 25.4 on a side facing away from the first passive arm module 30.1, said fourth active arm module 25.4 being connected to a second passive arm module 30.2 on a side facing away from the third active arm module 25.3. The second passive arm module 30.2 is connected to a fifth active arm module 25.5. A sixth active arm module 25.6 is arranged on the side facing away from the second passive arm module 30.2, on which the end effector is arranged on a first connection side 40.6 facing away from the fifth active arm module 25.5. The first connection side 40.6 of the sixth active arm module 25.6 thus forms an end effector connection side 35 to which the end effector may be connected.

The active arm modules 25 each have a drive device by which a further active arm module 25 connectable thereto or a passive arm module 30 may be rotated about an associated axis of rotation $Ra_n$ of the active arm module 25.

Similarly, the passive arm modules 30 do without the drive device. They are therefore embodied as a kind of extension part.

Depending on a number of active arm modules 25, the robot arm 20 also comprises a corresponding number of rotational axes $Ra_n$. This means that preferably any number of complete rotations of a respective active arm module 25 of the robot arm 20 may be performed in preferably both circumferential directions $Ura_n$ of a respective rotational axis $Ra_n$.

Furthermore, the following description refers to a polar coordinate system of a respective active arm module 25. The polar coordinate system in each case comprises a rotational axis $Ra_n$ referring in general and not to a specific active arm module 25. An axial direction $Aran$ of the active arm module 25 runs along the rotational axis $Ra_n$. A radial direction $Rra_n$ of the respective active arm module 25 runs perpendicularly outwards with respect to the respective rotational axis $Ra_n$. A circumferential direction $Ura_n$ of the respective active arm module 25 runs on a (circular) path around the rotational axis $Ra_n$ of the active arm module 25. The general nomenclature is used to explain the structure of the active arm module 25 in general.

Specifically, in FIG. 1, the rotational axes $Ra_n$, the axial directions $Ara_n$ and the circumferential directions $Ura_n$ of the respective active arm module 25 are designated according to their numbering. For example, a first rotational axis $Ra_1$ of the first active arm module 25.1 bears the index 1 as index at the position of n. A second rotational axis $Ra_2$ of the second active arm module 25.2 is labeled accordingly in FIG. 1. Similarly, the axial directions $Ara_n$, the radial directions $Rra_n$ and the circumferential directions $Ura_n$ of the active arm modules 25 are labeled accordingly. In FIG. 1, only all directions (the first rotational axis $Ra_1$, the first axial direction $Ara_1$ and the first circumferential direction $Ura_1$) for the first active arm module 25.1 are shown for reasons of clarity.

Furthermore, the explanation below refers to a further polar coordinate system of a respective passive arm module 30. The further polar coordinate system has a respective longitudinal axis $La_n$. An axial direction $Arp_n$ of the respective passive arm module 30 runs along the longitudinal axis $La_n$.

A respective rotational axis $Ra_n$ of the active arm module 25 is preferably associated with a force and/or torque sensor as well as, if applicable, a first and/or second sensor device of a respective active arm module 25, by which a force and/or a torque on the active arm module 25 as well as a position of the active arm module 25 relative to the rotational axis $Ra_n$ may be detected. The axis of rotation $Ra_n$ is exemplarily embodied as an ideal "joint" (rotational joint, pivot joint and/or swivel joint) of the multi-member or preferably modularly embodied robot arm 20, e.g. with respect to the robot base 15.

A force, torque and/or position sensor for monitoring forces and/or torques occurring on the robot arm 20 and/or a relative position of the arm modules 18 with respect to each other may be provided for the respective rotational axis $Ra_n$. This may also be limited to a portion of the robot arm 20.

A certain modular system for a robot arm 20 has at least one type of active arm module 25, for example of I, J, L or T-shaped embodiment, and preferably at least one type of passive arm module 30, for example of I, J, L or T-shaped embodiment. In FIG. 1, the active arm modules 25 are e.g. J-shaped or L-shaped, while the passive arm modules 30 are e.g. I-shaped.

In FIG. 1, all arm modules 18 of the modular system for robot arms 20 are preferably embodied in such a way that each of the arm modules 18 comprises at least two first, second, third and/or fourth connection sides 40, 45, 50, 55. The first to fourth connection sides 40, 45, 50, 55 of the arm modules 18 may correspond to each other and be connected to each other. In this regard, e.g. each active arm module 25 comprises a first connection side 40 and a second connection side 45. Each passive arm module 30 comprises a third connection side 50 and a fourth connection side 55. However, it is also possible for each active arm module 25 to comprise two first connection sides 40 or two second connection sides 45. Similarly, it is also possible for each passive arm module 30 to comprise two third connection sides 50 or two fourth connection sides 55.

For clear identification of the respective first to fourth connection sides 40, 45, 50, 55, the assignment of the first to fourth connection sides 40, 45, 50, 55 corresponds to the numbering of the active arm modules 25 or the passive arm modules 30. Thus, the first connection side of the first active arm module 25.1 is designated with the reference numeral 40.1 in FIG. 1.

The first connection side 40, the second connection side 45, the third connection sides 50 and the fourth connection sides 55 are embodied to correspond to each other. That is, a second connection side 45 of another active arm module 25 or a third connection side 50 of a passive arm module 30 might be connected to each first connection side 40 of an active arm module 25. Similarly, a first connection side 40 of another active arm module 25 or a fourth connection side 55 of a passive arm module 30 might be connected to each second connection side 45 of an active arm module 25.

In FIG. 1, the fourth connection side 55.3 of the third passive arm module 30.3 is exemplarily connected to the robot base 15. In addition to the mechanical connection of the fourth connection side 55.3 of the third passive arm module 30.3 for supporting forces and torques from the robot arm 20 on the robot base 15, the robot arm 20 is supplied with a (pressurized) fluid 51 via the fourth connection side 55.3 of the third passive arm module 30.3, in particular with compressed air or a pressurized hydraulic fluid, which is introduced into the robot arm 20 via the fourth connection side 55.3 of the third passive arm module 30.3. Furthermore, via the fourth connection side 55.3 of the third passive arm module 30.3, the robot arm 20 is electrically power-connected to an electrical power source 52 and data-connected to a data network 53.

A second connection side 45.1 of the first active arm module 25.1 is connected to a first connection side 40.2 of the second active arm module 25.2. The first passive arm module 30.1 is arranged between a second connection side 45.2 of the second active arm module 25.2 and a second connection side 45.3 of the third active arm module 25.3, wherein a fourth connection side 55.1 of the first passive arm module 30.1 is connected to the second connection side 45.2 of the second active arm module 25.2 at one end, and at the other end a further fourth connection side 55.1 of the first passive arm module 30.1 is connected to a second connection side 45.3 of the third active arm module 25.3. In the embodiment, both connection sides of the first passive arm module 30.1 are thus exemplarily embodied as fourth connection sides 55.1 of the first passive arm module 30.1 and thus correspondingly and/or complementary to the second connection side 45.2 of the second active arm module 25.2 and the second connection side 45.3 of the third active arm module 25.3. As a result, the second connection side 45.2 of the second active arm module 25.2 may be arranged at a distance from the second connection side 45.3 of the third active arm module 25.3 in a simple manner, and a predefined design of the robot arm 20 may be implemented in a simple manner. By way of example, in FIG. 1 a first connection side 40.3 of the third active arm module 25.3 is connected to a second connection side 45.4 of a fourth active arm module 25.4.

A second passive arm module 30.2 is exemplarily formed differently to the first passive arm module 30.1 in the module system. In the axial direction of the second passive arm module 30.2, the second passive arm module 30.2 is formed shorter than the first passive arm module 30.1. Furthermore, a third connection side 50.2 of the second passive arm module 30.2 is formed identically to the second connection side 45.4 of the fourth active arm module 25.4 and a fourth connection side 55.2 of the second passive arm module 30.2 is formed correspondingly and/or complementarily to the second connection side 45.5 of the fifth active arm module 25.5 and thus identically to the first connection side 40.5 of the fifth active arm module 25.5. Thus, in contrast to the first passive arm module 30.1, the second passive arm module 30.2 comprises the third connection side 50.2 and the fourth connection side 55.2 of the second passive arm module 30.2, respectively, which are different from each other, at its ends.

At the first connection side 40.5 of the fifth active arm module 25.5, the fifth active arm module 25.5 is connected to a second connection side 45.6 of the sixth active arm module 25.6. A first connection side 40.6 of the sixth active arm module 25.6 is connected to the end effector.

Via the arm modules 18 and their first to fourth connection sides 40, 45, 50, 55, the end effector is supplied with the fluid 51 as described in further detail and is electrically connected to the electrical power source 52 and data-connected to the data network 53. Similarly, the active and passive arm modules 25, 30 are data-connected to the data network 53, e.g. to a field bus or an EtherCAT network, and power-connected to the electrical power source 52 via their first to fourth connection sides 40, 45, 50, 55.

Each of the active arm modules 25 comprises a first housing 60, each of the first housings 60 internally defining a first housing interior 65. A first connection side 40 is arranged at one end of each of the first housings 60. The first connection side 40 is rotatably mounted about the axis of rotation $Ra_n$ relative to the first housing 60, and is controllably driven by the drive device of the respective active arm module 25. The second connection side 45 is e.g. oriented in an inclined manner, preferably perpendicularly, with respect to the first connection side 40, and is connected to the first housing 60 in a torque-proof manner. The first housing interior 65 is arranged for fluidic, electrical and data connection of the first connection side 40 to the second connection side 45, which will be discussed in detail later.

When the drive device of the active arm module 25 is activated, the drive device rotates the first connection side 40 relative to the first housing 60. Depending on the embodiment of the robot arm 20, the drive device thus swivels the active arm module 25, except for its own first connection side 40, about the associated axis of rotation $Ra_n$, or only the first connection side 40 about the associated axis of rotation $Ra_n$.

In FIG. 1, for example, the drive device of the first active arm module 25.1 e.g. swivels the first active arm module 25.1 and the arm modules 18 further attached to the second connection side 45.1 of the first active arm module 25.1 and the end effector about the first axis of rotation $Ra_1$. The sixth active arm module 25.6 is exemplarily mounted in identical orientation with respect to the first active arm module 25.1. For example, the drive device of the sixth active arm module 25.6 drives the first connection side 40.6 and rotates the end effector attached to the first connection side 40.6 of the sixth active arm module 25.6. The first housing 60 and the second connection side 45.6 of the sixth active arm module 25.6 are stationary.

In case of the robot arm 20 shown in FIG. 1, the first axis of rotation $Ra_1$ is not restricted by way of example, i.e. the robot arm 10 may be permanently rotated in the same circumferential direction $Ura_1$. Thus, with the arm modules 18 shown in FIG. 1, a robot arm 20 of any embodiment may be embodied which may reproduce numerous common kinematics.

It is of course possible to design the respective rotational axis $Ra_n$ only as a pivot axis, i.e. a movement of the respective active arm module 25 is limited to a certain angle, such as angles smaller than: 720°, 540°, 360°, 270°, 180°, 90° or 45°. For example, in FIG. 1, the second axis of rotation $Ra_2$ is preferably restricted to a predefined angle, such as 180°, to prevent the robot arm 20 from striking the robot base 15. Also, a constraint may be imposed on the movement of the active arm modules 25 such that the arm modules 18 do not collide with each other. The restriction may be mechanical or control-related, in particular software-related.

The passive arm modules 30 each include a second housing 70, the second housing 70 being embodied as a hollow body and extending along the longitudinal axis $La_n$ in the axial direction $Arp_n$. In FIG. 1, by way of example, the second housing 70 has a truncated-cone shape with a circular cross-section. The third connection side 50 of the passive arm module 30 is connected to the second housing 70 in a torque-proof manner at a front face of the second housing 70, and is connected to the second housing 70 in a torque-proof manner. At another front end of the second housing 70, the fourth connection side 55 of the passive arm module 30 is arranged and connected to the second housing 70 in a torque-proof manner. Thereby, due to the hollow embodiment of the second housing 70, the second housing 70 has a particularly high bending and torsional stiffness, so that the passive arm module 30 may transmit a high load.

In the modular system, the arm module 18 may have different sizes. In particular, the first or second housing 60, 70 may have different lengths and/or different cross-sectional areas of the first to fourth connection sides 40, 45, 50, 55, so as to easily obtain a desired geometric embodiment of the robot arm 20 when combining the arm modules 18 from the modular system.

The modular system may be embodied in such a way that the arm modules 18 each belong to different assemblies that have different geometric embodiment but are functionally identical to one another.

In the embodiment, the first active arm module 25.1 and the second active arm module 25.2 are embodied identically and have the same geometric embodiment in terms of structure. In FIG. 1, the first active arm module 25.1 and the second active arm module 25.2 belong to a first assembly, which, geometrically, has the largest embodiment and the largest extension.

The third active arm module 25.3 and the fourth active arm module 25.4 are geometrically smaller in design than the first and second active arm modules 25.1, 25.2 so that torques and forces for the first and second active arm modules 25.1 and 25.2 are reduced. They belong to a second assembly. Similarly, the fifth active arm module 25.5 and the sixth active arm module 25.6 belong to a third assembly, which has the smallest embodiment. Due to the fact that the arm modules 18 belong to smaller assemblies with increasing distance from the robot base 15, the passive arm module 30 connected to the robot base 15, in the embodiment the third passive arm module 30.3, is relieved of mechanical load.

The above-described embodiment of the modular system has the advantage that a multi-axis robot arm 20 may be assembled in a simple manner with individual active arm modules 25 and, as the case may be, by at least one passive arm module 30, tailored individually to the requirements from the active or passive arm modules 25, 30 of the modular system.

By manufacturing the arm modules 18 independently of the robot arm 20, the industrial robot 10 shown in FIG. 1 may be assembled in a particularly short time (within a few minutes). Also, after completion of the industrial robot 10, the industrial robot 10 may be flexibly adapted and, if necessary, expanded or reduced by further (arm) modules of the modular system for adapting the industrial robot 10 to a different task. For example, an existing robot arm having four rotational axes $Ra_n$ may be modified by two additional active arm modules 25 (if necessary subsequently) mounted between the end effector and the existing arm modules 18, e.g. on the industrial robot 10 shown in FIG. 1.

Furthermore, the arrangement of conductors, cables or other connections on the outside of the industrial robot 10 may be dispensed with by the internal guiding of the fluid 51, the electrical power and the data connection may be dispensed with, so that unintentional damage to the industrial robot 10 may be avoided.

Figure 2:
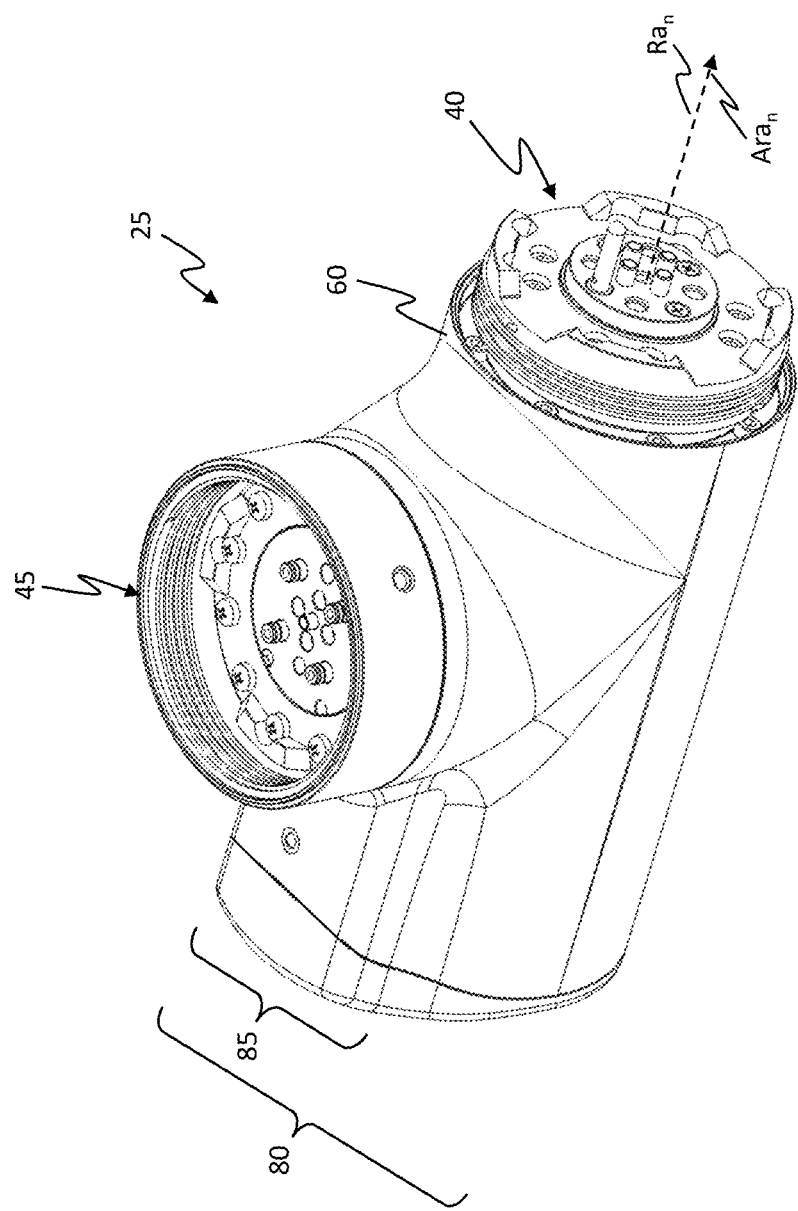
FIG. 2 depicts a perspective view of an active arm module of the robot arm shown in FIG. 1 according to a first embodiment.

FIG. 2 shows a perspective view of the active arm module 25 shown in FIG. 1.

The active arm module 25 is also identical across the assemblies in each case, although only the geometric embodiment is adapted accordingly. In other words, the active J-shaped active arm modules 25 of the different assemblies are scaled with regard to each other.

In the embodiment, the first connection side 40 is arranged in a rotational plane of rotation perpendicular to the axis of rotation $Ra_n$. The second connection side 45 is arranged at an incline radially outwardly to the axis of rotation $Ra_n$ and is aligned at an incline, preferably perpendicularly, to the first connection side 40.

The first housing 60 includes a first housing portion 80 that is substantially cylindrical in shape. The first housing portion 80 extends substantially about the axis of rotation $Ra_n$. Laterally to a circumferential side of the first housing portion 80, a second housing portion 85 is arranged on the first housing portion 80, wherein the second housing portion 85 is formed narrower than the first housing portion 80 in the axial direction $Ara_n$. The second housing portion 85 is formed substantially in a trough shape. On a side facing away from the first housing portion 80, the second connection side 45 is arranged at the second housing portion 85. Thereby, the second connection side 45 protrudes beyond the second housing portion 85. The second connection side 45 may be arranged off-center with respect to a maximum longitudinal extent in the axial direction $Ara_n$. A particularly compact arrangement and a particularly favorable transmission of force between the first connection side 40 and the second connection side 45 is provided if, in the axial direction $Ara_n$, the second connection side 45 is arranged adjacent to the first connection side 40 on the first housing 60. In particular, this means that a bending stress on the first housing 60 for force transmission is particularly low.

Figure 3:
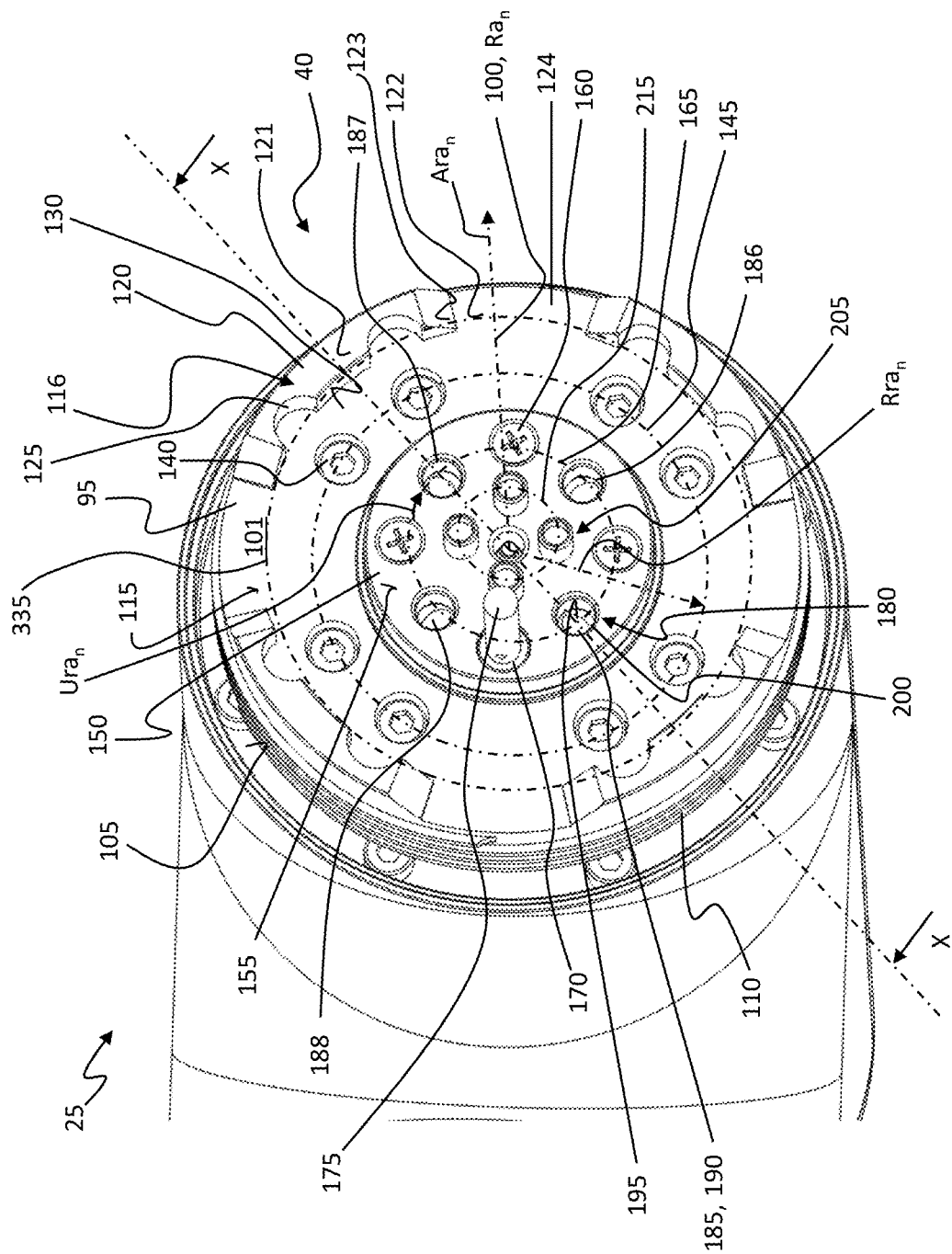
FIG. 3 depicts a perspective view of a portion of the active arm module shown in FIG. 2.

FIG. 3 shows a perspective view of a section of the active arm module 25.

The first connection side 40 comprises a first connection plate 95. The first connection plate 95 is exemplarily circular in top view and extends perpendicular to a first mounting axis 100, wherein the first mounting axis 100 is configured as a rotational axis $Ra_n$ in an embodiment of the arm module as an active arm module 25. In other words, the first mounting axis 100 and the rotational axis $Ra_n$ overlap.

On a first outer peripheral side 105, the first connection plate 95 preferably has an external thread 110. The external thread 110 is multi-start. It is of particular advantage here if the external thread 110 is at least three-start, preferably four-start. It is also advantageous if the external thread 110 is embodied as a fine thread.

The first connection side 40 comprises a first contact side 101. The first contact side 101 comprises a first front face 115 and a second front face 155, the first front face 115 being arranged radially outwardly of the second front face 155.

In the radial direction $Rra_n$, a first face gearing 116 adjoins the first outer circumferential side 105 on the first front face 115 of the first connection plate 95 inwardly. In the embodiment, the first face gearing 116 is formed as a self-centering face gearing, exemplarily as a Hirth joint. In this regard, the first face gearing 116 has a plurality of first teeth 120 arranged offset in the circumferential direction, which in the embodiment are exemplarily embodied identically to one another. A first tooth tip 121 of the first tooth 120 has a planar embodiment and extends in a rotational plane perpendicular to the rotational axis $Ra_n$, and thus in parallel to the first front face 115. A first tooth base 122, which is circumferentially arranged between two first teeth 120, is embodied by the first front face 115. Each of the first tooth flanks 123 of the first tooth 120 is oriented toward the axis of rotation $Ra_n$ with at least one direction. The first tooth base 122 is circumferentially arranged between two facing first tooth flanks 122. A first tooth space 124 is arranged between each two first teeth 120, which is bounded in the circumferential direction by the first tooth flanks 123 and in the axial direction by the first tooth base 122.

For example, at least one first fastening 140 is arranged radially on the inside of the first face gearing 116. The first fastening 140 may e.g. be embodied as a first screw. A first screw head of the first screw may be recessed in the first connection plate 95. Preferably, a plurality of first fastenings 140 are arranged on the first connection plate 95, each of the first fastenings 140 being arranged radially inwardly of the first tooth 120. The first fastenings 140 are arranged extending along a first circular path 145 around the axis of rotation $Ra_n$. In this regard, two first fastenings 140 are exemplarily arranged radially on the inner side of a first tooth 120 for each first tooth 120. Furthermore, at least one first indentation 125 may be arranged in the first tooth 120. The first indentation 125 may be embodied as a bore. The first indentation 125 may be open radially inwardly toward an inner circumferential side 130 of the first tooth 120. In the axial direction $Ara_n$, the first indentation 125 extends to approximately the level of the first front face 125 such that an indentation bottom of the first indentation 125 and the first front face 115 transition smoothly. In the embodiment, two identically formed first indentations 125 are exemplarily provided for each first tooth 120. The first indentations 125 may be arranged along a shared fourth circular path 335 about the axis of rotation $Ra_n$.

Radially inwardly of the first fastenings 140, the first connection side 40 comprises a first connection element 150. The first connection element 150 comprises the second front face 155, the second front face 155 being embodied to run in parallel to the first front face 115. The first connection element 150 is arranged by at least one second fastening 160, preferably a plurality of fastenings offset with regard to one another in the circumferential direction of $Ura_n$ on a second circular path 165 about the axis of rotation $Ra_n$. The second fastening 160 is e.g. embodied as a second screw, wherein a second screw head of the second fastening 160 is recessed in the first connection element 150.

The second circular path 165 and the first circular path 145 are arranged concentrically with regard to each other. In each case, a center point lies on the axis of rotation $Ra_n$ and thus on the first assembly axis 100. In the circumferential direction of $Ura_n$, e.g. three second fastenings 160 are each arranged at a 90° angle with regard to one another relative to the axis of rotation $Ra_n$, so that an angle of 180° exists between two second fastenings 160 as an example.

The first connection element 150 has a first pin receptacle 170 in the circumferential direction $Ura_n$ between the two second fastenings 160, which are e.g. arranged at a distance of 180° with regard to one another. The first pin receptacle 170 is exemplarily formed as a through opening and is arranged in the circumferential direction $Ura_n$ centrally on the second circular path 165 between the two second fastenings 160, which are e.g. arranged 180°.

The first connection face 40 further includes a pin 175, the pin 175 being screwed into the back of the first connection plate 95. In this regard, the pin 175 engages through the first pin receptacle 170 and, together with the second fastenings 160, secures the first connection element 150 at the first connection plate 95. The pin 175 protrudes beyond the second front face 155 and extends in parallel to the first mounting axis 100 or the axis of rotation $Ra_n$.

The first connection plate 95 comprises at least one of the following first materials: metal, aluminum, steel, titanium aluminum alloy, high strength aluminum alloy, AW7075, fiber-reinforced plastic, glass-fiber-reinforced plastic (GRP), carbon-fiber-reinforced plastic (CfRP). The first connection element 150 comprises at least one of the following second materials: an electrically non-conductive material, plastic, thermoplastic, polyamide, PA GF30, PA6 GF 30. The pin 175 comprises at least one of the following third materials: metal, aluminum, steel, electrically conductive plastic, brass, copper. Due to the fact that the pin 175 is screwed into the first connection plate 95 on the rear side, the pin 175 is electrically connected to the first connection plate 95. Furthermore, the pin 175 fastens the first connection element 150 to the first connection plate 95.

The first connection element 150 further comprises a first fluid contact device 180. In the embodiment, the first fluid contact device 180 is exemplarily embodied as a bushing or female. Thereby, the first fluid contact device 180 comprises at least one first fluid contact 185. In the exemplary embodiment, the fluid contact device 180 comprises second to fourth fluid contacts 186 to 188 in addition to the first fluid contact 185.

Each of the first to fourth fluid contacts 185 to 188 is fluidically separated from the respective other first to fourth fluid contact 185 to 188. In the embodiment, the first to fourth fluid contacts 185 to 188 are formed by a tube receptacle 190 formed as a blind hole in the first connection element 150. The first to fourth fluid contacts 185 to 188 are formed identically to one another.

The tube receptacle 190 opens into the second front face 155. The tube receptacle 190 has a sealing surface 195 at a first inner circumferential side. A fluid connection channel 200 respectively opens into a bottom of the tube receptacle 190. The fluid connection channels 200 run fluidically separated with regard to one another in the first connection plate 95. In the circumferential direction $Ura_n$, the first to fourth fluid contacts 185 to 188 are arranged at least partially on the second circular path 165. The first to fourth fluid contacts 185 to 188 are arranged with their center axis slightly offset inwardly with respect to the second circular path 165.

In the circumferential direction $Ura_n$, the first to fourth fluid contacts 185 to 188 are arranged offset with regard to one another by 90°. As an example, one of the first to fourth fluid contacts 185 to 188 is arranged centrally in the circumferential direction $Ura_n$ between two second fastenings 160 or centrally between the pin 175 and a second fastening 160 arranged closest to the pin 175 in the circumferential direction $Ura_n$.

Radially inwardly to the second circular path 165, and thus also to the first fluid contact device 180 and the second fastenings 160, the first connection side 40 has a first power contact device 205 at the first connection element 150.

Figure 4:
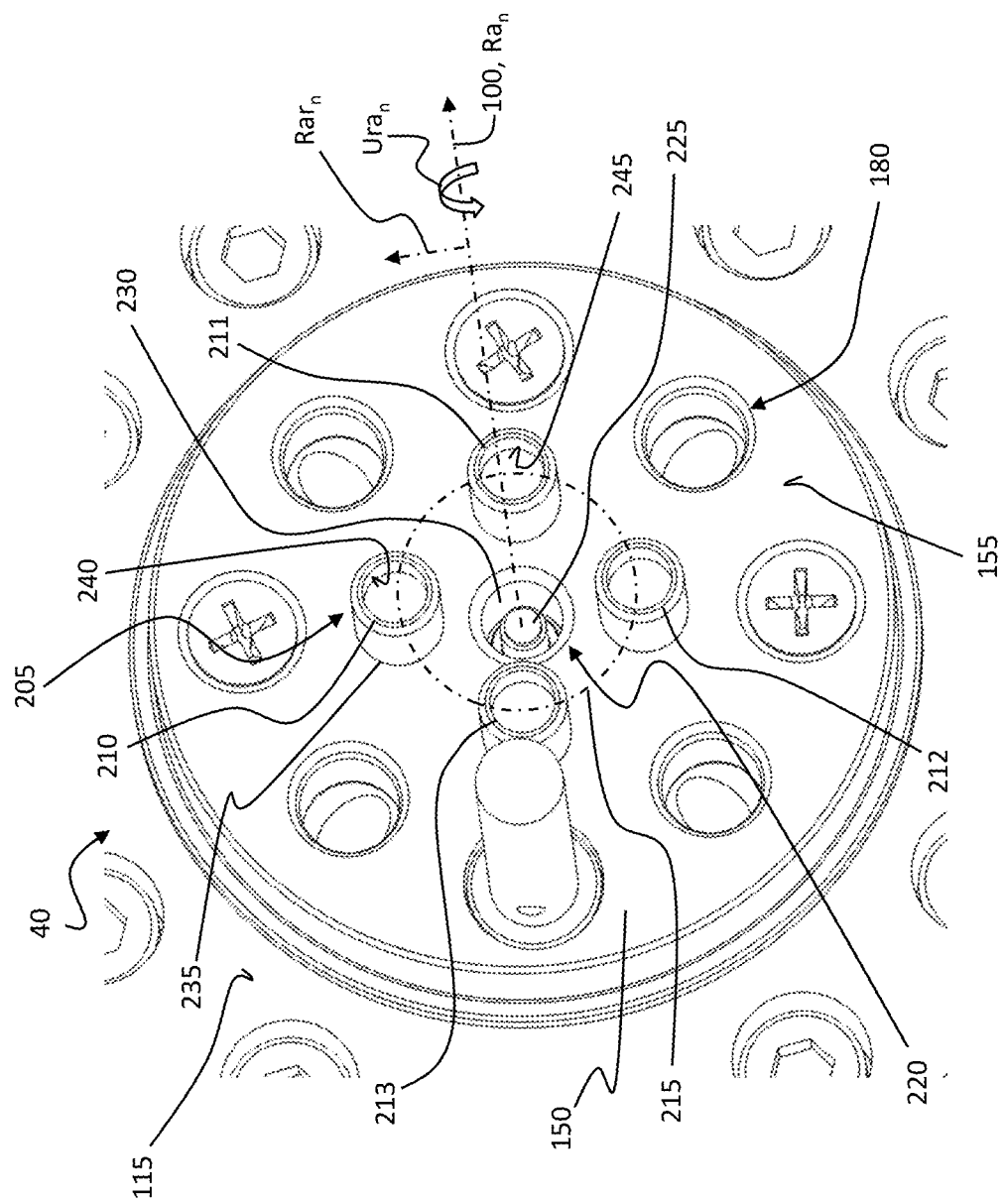
FIG. 4 is an enlarged section of a first connection side of the active arm module shown in FIG. 3.

FIG. 4 shows an enlarged section of the first connection side 40 of the active arm module 25 shown in FIG. 3.

The first connection side 40 further comprises a first contact device 220, wherein the first contact device 220 is configured for transmitting data and exemplarily comprises a first contact element 225. The first contact element 225 is arranged to extend along the first mounting axis 100, and extends along the first mounting axis 100. The first contact element 225 is e.g. embodied to be light-conducting and to transmit the optical signal.

The first contact device 220 is formed as a socket and has a contact receptacle 230, wherein the contact receptacle 230 is formed in a blind-hole-like manner in the first connection element 150, wherein the first contact element 225 extends in the contact receptacle 230. The first contact receptacle 230 opens into the second front face 155.

Due to the central arrangement of the first contact device 220 for transmitting data, the first power contact device 205 is in radial direction $Rra_n$ arranged between the first fluid contact device 180 and the first contact device 220. This embodiment has the advantage that the first connection side 40 requires a particularly small installation space in the radial direction $Rra_n$.

The first power contact device 205 e.g. comprises, in addition to a first power contact 210, at least one second power contact 211, and preferably also a third and fourth power contact 212, 213. The first to fourth power contacts 210 to 213 are each arranged offset from one another in the circumferential direction $Ura_n$, exemplarily at a 90° angle. For each of the first to fourth power contacts 210, 211, 212, 213, the connection element 150 has a first power contact receptacle 235. The first power contact receptacle 235 is formed as a through opening in the first connection element 150. The first power contact receptacle 235 opens into the second front face 155. Each of the first to fourth power contacts 210 to 213 is e.g. formed identically to the other first to fourth power contacts 210 to 213.

Each of the first to fourth power contacts 210 to 213 is embodied as a socket. Each of the first to fourth power contacts 210 to 213 protrudes beyond the first front face 155 and comprises an associated contact surface 240, 245 on an inner peripheral side thereof. The contact surface 240, 245 is cylindrical in shape. The contact surface 240, 245 may further extend over a bottom of the first to fourth power contacts 210 to 213. For example, the first power contact 210 has a first contact surface 240 and the second power contact 211 has a second contact surface 245.

By way of example, the first power contact 210 may be connected to a first terminal, generally referred to as the first contact, and the second power contact 211 may be connected to a second terminal, generally referred to as the second contact, of the electrical power source.

In top view, the first to fourth power contacts 210 to 213 are circular in shape. Thereby, a cross-sectional area is significantly smaller than that of the first to fourth fluid contacts. Electrically, the first to fourth power contacts 210 to 213 are electrically insulated from one another by the electrically non-conductive first connection element 150.

Here, by way of example, in the circumferential direction $Ura_n$, each of the first to fourth power contacts 210 to 213 is arranged in a shared plane in which the rotational axis $Ra_n$ and the second mounting 160 are arranged. The first to fourth power contacts 210 to 213 are e.g. arranged concentrically on a third circular path 215 about the first mounting axis 100 and the rotational axis $Ra_n$, respectively. The first power contact device 205 is configured to transmit electrical power, e.g. to supply electrical power to the active arm module 25 and/or the passive arm module.

For example, the electrical power source may be a DC power source. In addition, the first and second power contacts 210, 211 may each e.g. be connected to one terminal of the DC power source. The third and fourth power contacts 212, 213 may each be connected to a further terminal of a further DC voltage power source or an AC voltage power source, wherein the two DC voltage power sources may have a different voltage, for example. As a result, electrical power from two (different) electrical power sources may be transmitted separately via the first connection side 40.

Figure 5:
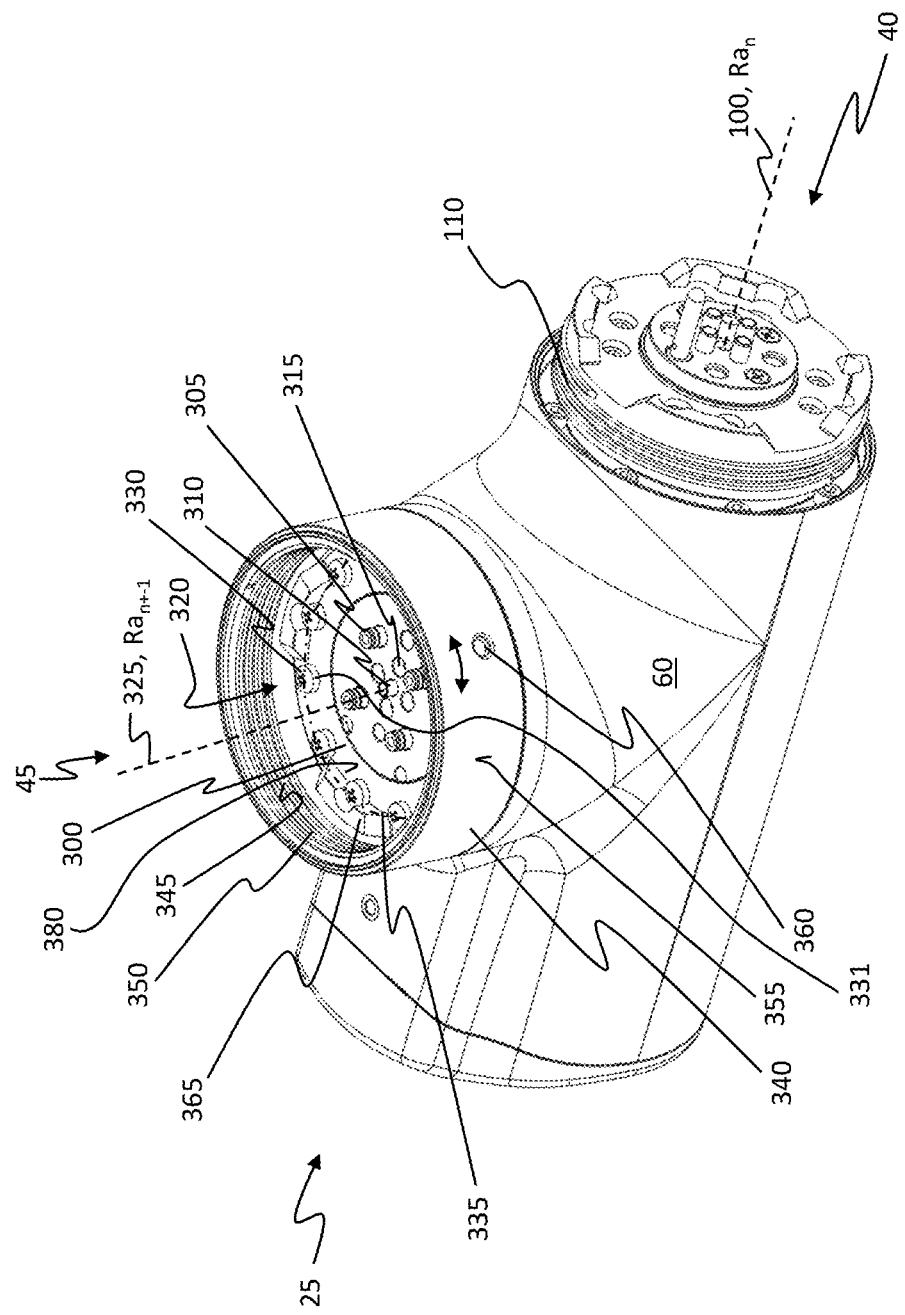
FIG. 5 shows a perspective view of the active arm module shown in FIG. 2.

FIG. 5 shows a perspective view of the active arm module 25 in FIG. 3.

The second connection side 45 is mechanically connected to the first housing 60 in a torque-proof manner. The second connection side 45 comprises a second connection plate 300, a second fluid contact device 305, a second contact device 310, a second power contact device 315, and a second contact side 320.

In an exemplary embodiment, the second connection plate 300 is oriented in parallel to the first mounting axis 100 and the rotational axis $Ra_n$. In a top view, the second connection plate 300 has a substantially circular configuration. In this context, a second mounting axis 325 is oriented in an inclined manner, preferably oriented perpendicular to the first mounting axis 100. The second contact side 320 and the second connection plate 300 are oriented perpendicular to the second mounting axis 325. Attached to the second connection plate 300 are the second fluid contact device 305, the second contact device 310, and the second power contact device 315. The second fluid contact device 305, the second contact device 310, and the second power contact device 315 extend longitudinally or in parallel to the second mounting axis 325.

The second connection plate 300 is mechanically connected to the first housing 60 in a torque-proof manner by a third fastening 330, preferably a plurality of third fastenings 330 arranged offset relative to one another in the circumferential direction with respect to the second mounting axis 325, which may e.g. be third screws. The third fastenings 330 are e.g. arranged on the fourth circular path 335 circumferentially around the second mounting axis 325 at a regular distance. The third screw may include a third screw head 331, wherein the third screw head 331 protrudes beyond a second front face 380 of the second contact side 320 and rests on the second front face 380. The third screw head 331 has a smaller maximum outer diameter than the first indentation (shown in FIG. 3) of the first contact side 40.

On the circumferential side, the second connection plate 300 is embraced by a fastening ring 340 of the active arm module 25. The fastening ring 340 has an internal thread 350 on a second inner circumferential side 345, the internal thread 350 being embodied to correspond or at least complement the external thread 110 of the first connection side 40. The fastening ring 340 is axially fixed relative to the first housing 60. However, the fastening ring 340 is rotatable about the second mounting axis 325 relative to the first housing 60.

When assembling e.g. the second active arm module 25.2 at the first active arm module 25.1 (cf. FIG. 1), the first connection side 40.2 of the second active arm module 25.2 is placed on the second connection side 45.1 of the first active arm module 40.1 and the internal thread 350 is screwed onto the external thread 110 by twisting the fastening ring 340. This presses the first contact side 101 onto the second contact side 320.

Preferably, the fastening ring 340 comprises at least one of the following fourth materials: metal, aluminum, steel, titanium, aluminum alloy, high strength aluminum alloy, AW7075, fiber reinforced plastic, glass fiber reinforced plastic (GRP), carbon fiber reinforced plastic (CfRP).

It is particularly advantageous if, especially in the case of a substantially identical design of the first material and the fourth material, a tool receptacle 360 is arranged on a second outer circumferential side 355, which in the embodiment is substantially cylindrical in shape, the tool receptacle 360 being embodied e.g. as a blind hole. Thereby, for disassembling or twisting the fastening ring 340 relative to the external thread 110 or the first housing 60, respectively, an (increased) torque may be introduced into the fastening ring 340 by a tool engaging the tool receptacle 360, in order to disengage the fastening ring 340 from the external thread 110.

On the circumferential side, the fastening ring 340 surrounds the second connection plate 300. Adjacent to the fastening ring 340 on the inside, the second connection plate 300 has a second face gearing 365. The second face gearing 365 is preferably formed as a Hirth joint. The second face gearing 365 may be embodied complementary or preferably correspondingly to the first face gearing 116. The second face gearing 365 is arranged in a radial direction between the fourth circular path 335 and/or the third fastenings 300 and the fastening ring 340. The third fastenings 300 connect the second connection side 45 to the first housing.

Figure 6:
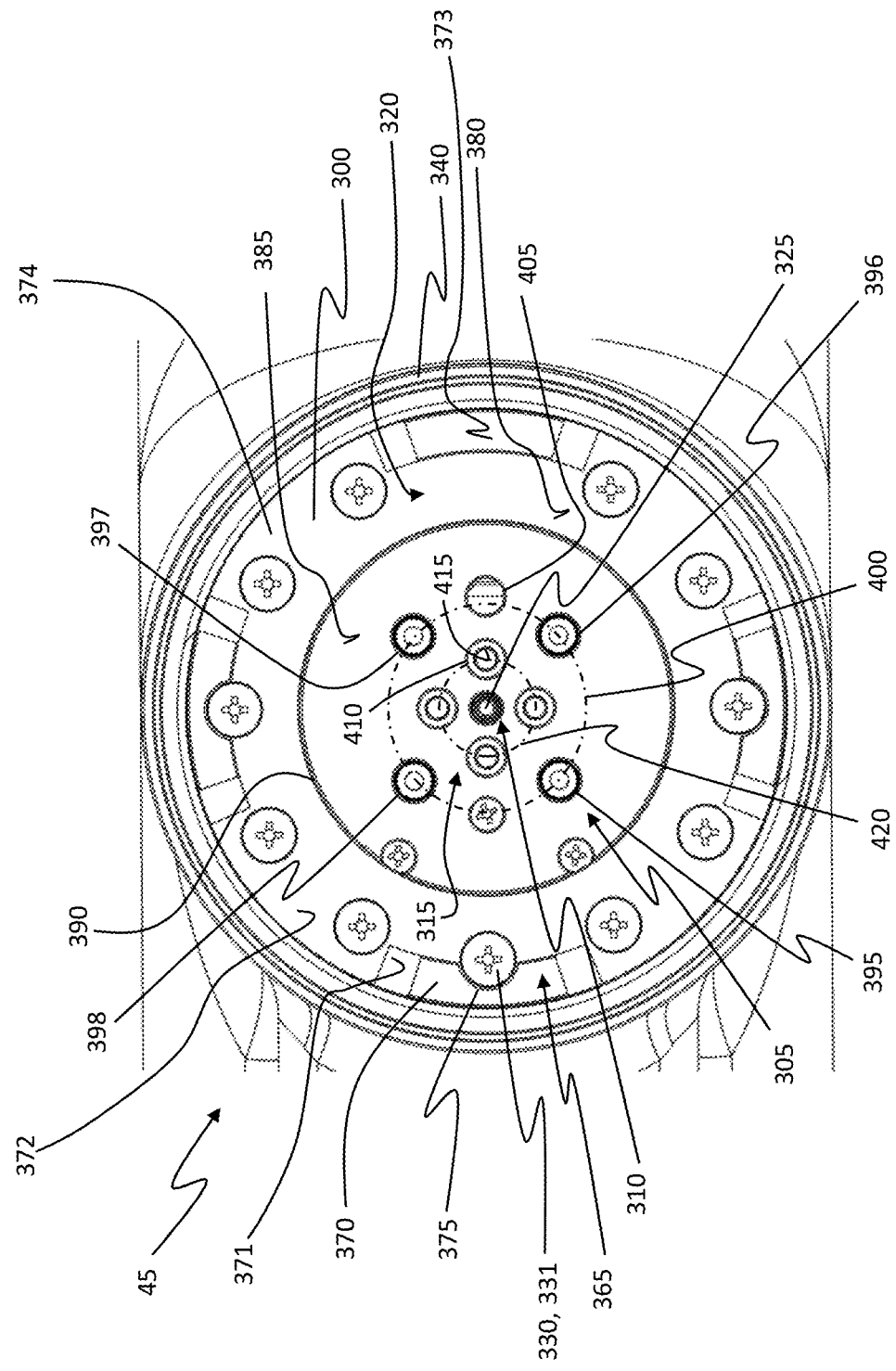
FIG. 6 is a top view of a second connection side of the active arm module shown in FIG. 2.

FIG. 6 shows a top view of the second connection side 45 of the active arm module 25 shown in FIG. 2.

The first face gearing 116 and the second face gearing 365 are embodied to correspond to each other. The second face gearing 365 has a plurality of second teeth 370 that are circumferentially offset from one another and arranged on a shared partial circle about the second mounting axis 325. A second indentation 375 may be arranged in each second tooth 370 of the second face gearing 365 to provide a compact configuration of the second connection side 45, wherein a third fastening 330 is respectively arranged in the second indentation 375. The second indentation 375 is formed to be open radially inwardly. The second indentation 375 is formed to correspond to the second screw head 331 and receives the second screw head 331.

Each of the second teeth 370 includes a second tooth flank 371. Between the second teeth 370, the second face gear 365 has a second tooth base 372 that extends in a plane perpendicular to the second mounting axis 325. The second tooth base 372 and the third front face 380 are disposed in a shared plane and are stepless with respect to each other. Each of the second teeth 370 includes a second tooth tip 373 that is planar in shape and extends in a plane perpendicular to the second mounting axis 325. In the circumferential direction with respect to the second mounting axis 325, a second tooth space 374 is arranged between each of the second teeth 370 arranged closest in the circumferential direction with respect to the second mounting axis.

The second contact side 320 is embodied substantially correspondingly to the first contact side. In this regard, the second contact side 320 comprises the third front face 380 and a fourth front face 385, wherein the third front face 380 is arranged radially inwardly adjacent to the fastening ring 340. The third front face 380 has an approximately annular configuration in a top view, with the second face gearing 365 and the third fastening 330 being arranged on the third front face 380.

For receiving the first connection element 150, the second connection plate 300 has a connection receptacle 390. The connection receptacle 390 is embodied to correspond to the first connection element 150 and is delimited at its base by the fourth front face 385.

The second fluid contact device 305 is arranged at the fourth front face 385. The second fluid contact device 305 is embodied to correspond to the first fluid contact device (cf. FIGS. 3 and 4). Thereby, the second fluid contact device 305 may comprise a fifth fluid contact 395. Preferably, the second fluid contact device 305 has a sixth to eighth fluid contact 396 to 398 in addition to the fifth fluid contact 395, so that the second fluid contact device 305 and the first fluid contact device 180 have the same number of fluid contacts 395 to 398.

In the embodiment, the fifth to eighth fluid contacts 395 to 398 are circumferentially offset by 90° relative to the second mounting axis 325 on a fifth circular path 400 about the second mounting axis 325. Between the sixth fluid contact 396 and the seventh fluid contact 397 arranged closest to the sixth fluid contact 396 in the circumferential direction, a second pin receptacle 405 is e.g. arranged centrally in the second connection plate 300. The second pin receptacle 405 may e.g. be embodied as a blind hole or as a bore in the second connection plate 300. The second pin receptacle 405 is embodied to correspond to the pin 175 (cf. FIGS. 3 and 4). The pin receptacle 405 is arranged radially outwardly offset from the fifth circular path 400, but partially overlaps the fifth circular path 400.

The second contact device 310 is arranged on the second mounting axis 325 and extends along the second mounting axis 325.

Radially arranged between the second contact device 310 and the second fluid contact device 305, the second power contact device 315 is arranged. The second power contact device 315 is configured to correspond to the first power contact device 205 and, in the embodiment, is plug-shaped or a male configuration.

Figure 7:
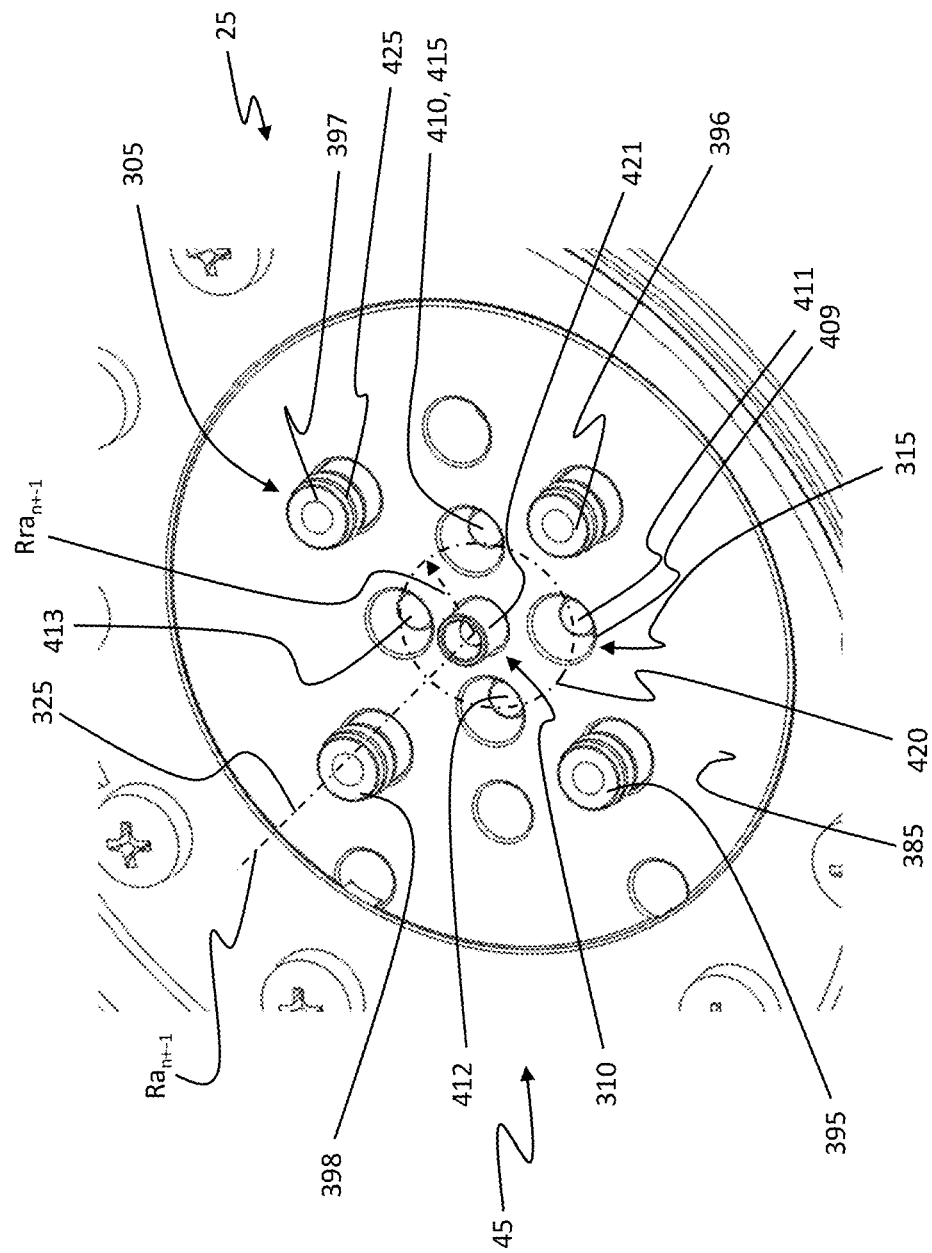
FIG. 7 depicts a perspective view of the second connection side of the active arm module shown in FIG. 6.

FIG. 7 shows a perspective view of the second connection side 45 of the active arm module 25 shown in FIG. 6.

The second contact device 310 is embodied as a plug/male and corresponding to the first contact device 220. The second contact device 310 has a second contact element 421, wherein the second contact element 421 is arranged centrally on the second mounting axis 325 and is sleeve-shaped. In addition, at least one lens or lens arrangement of the second contact device 310 may be arranged in the second contact element 421. The second contact element 421 thereby protrudes beyond the fourth front face 385.

In this case, the second power contact device 315 has a fifth power contact 410 embodied to correspond to the first power contact, the fifth power contact 410 having a pin-shaped embodiment. On the circumferential side and/or on the end side, the fifth power contact 410 has a third contact surface 415. The fifth power contact 410 is arranged at a second power contact receptacle 409 and is recessed with respect to the fourth front face 385. The fifth power contact 410 may be spring-mounted in the second contact receptacle 409.

In addition to the fifth power contact 410, the second power contact device 315 also comprises, by way of example, a sixth, seventh and eighth power contact 411, 412, 413, which are likewise embodied in a pin-shaped manner by way of example and are embodied identically to the fifth power contact 410 in the embodiment. The sixth to eighth power contacts 411 to 413, as well, are also recessed in a respective second power contact receptacle 409. The recessed arrangement of the fifth to eighth power contacts 410, 411, 412, 413 protects the fifth to eighth power contacts 410, 411, 412, 413 from contact.

In the radial direction Rara$_{n±1}$ with respect to the second mounting axis 325 between the second fluid contact device 305 and the second contact device 310, the fifth to eighth power contacts 410, 411, 412, 413 are arranged concentrically on the sixth circular path 420 about the second mounting axis 325.

In the embodiment, the fifth to eighth fluid contacts 395 to 398 are e.g. embodied identically to each other. Thereby, the fifth fluid contact 395 is exemplarily tubular in shape. The fifth fluid contact 395 extends in parallel to the second mounting axis 325, with a fixed end connecting the fifth fluid contact 395 to the fourth front face 385. The fifth fluid contact 395 is exemplarily embodied as a male. In this case, the second fluid contact 395 opens at a distance on a side facing away from the fourth front face 385. On the circumferential side, the fifth fluid contact 395 in each case comprises a first sealing element 425, preferably an O-ring, which may be arranged in a groove, for example of the fifth fluid contact 395, on the circumferential side.

Figure 8:
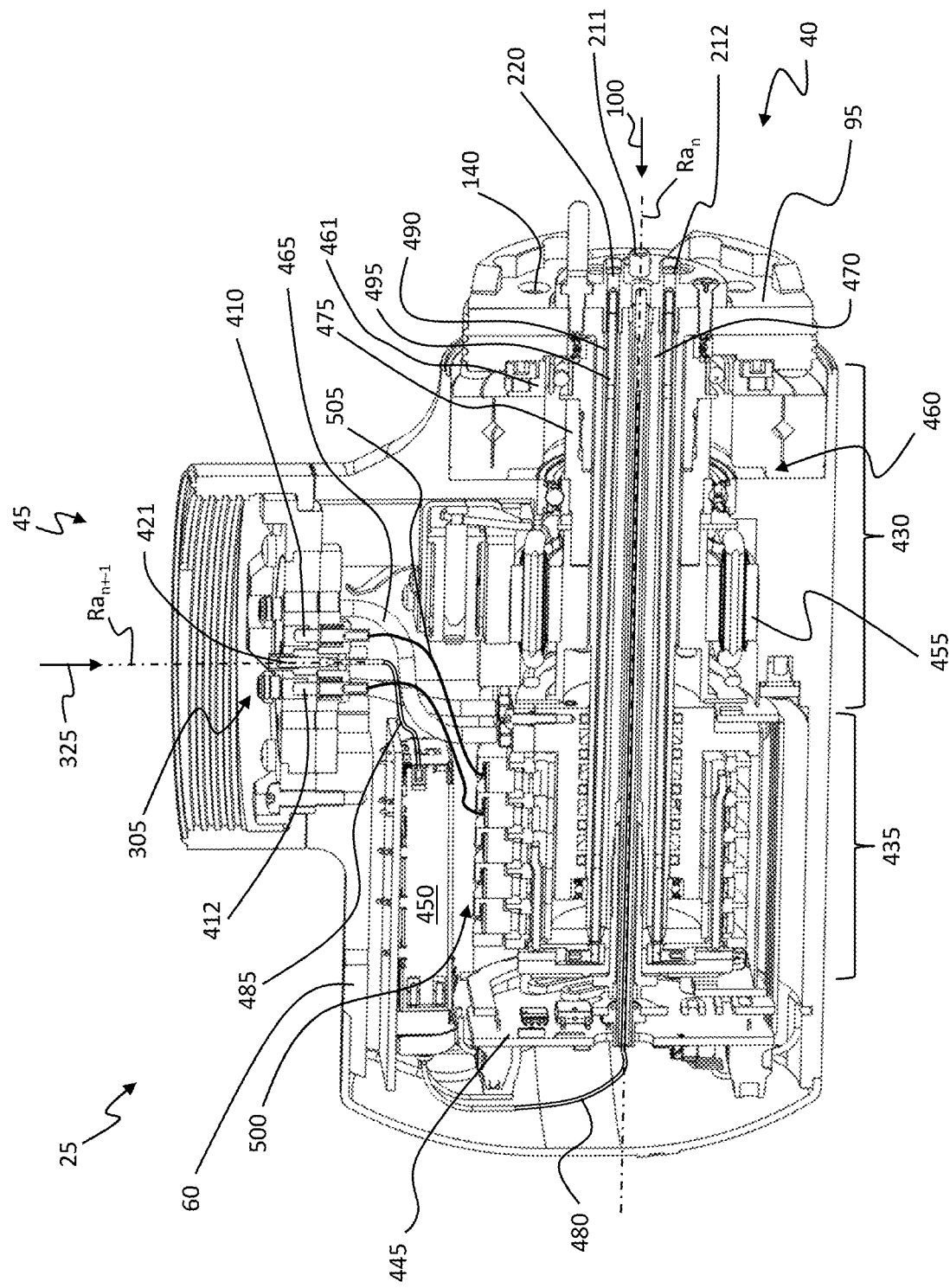
FIG. 8 shows a perspective half-longitudinal section through the active arm module shown in FIG. 2.

FIG. 8 shows a perspective half-longitudinal section through the active arm module 25 shown in FIG. 2.

The active arm module 25 comprises, in the first housing 60, a drive device 430, a transfer device 435, a controller 445, and at least one converter 450.

The drive device 430 comprises an electric machine 455 and a gear device 460, the gear device 460 being connected to the electric machine 455 on the input side. On the output side, the gear device 460 comprises an output flange 491. The output flange 461 is connected to the connection plate 95 in a torque-proof manner by the first fastening 140. In this connection, e.g. a screw of the first fastening 140 is screwed into the output flange 461. In operation of the electric machine 455, the electric machine 455 drives the gear device 460 at a motor speed. The gear device 460 reduces the motor speed to an output speed, preferably at a reduction ratio of 1:30 to 1:200. The output speed is applied to the output flange 461. The output flange 461 of the gear device 460 drives the first connection side 40 via the first fastening 140 and in this case in particular the first connection plate 95. Thereby, the gear device 460 is arranged axially between the electric machine 455 and the first connection side 40 with respect to the axis of rotation Ra$_n$, which overlaps with the first mounting axis 100. Due to the torque-proof connection with the first connection plate 95, the first hollow shaft 470 is coupled to the output flange 461 in a torque-proof manner and rotates at the output speed.

The transfer device 435 is arranged axially on a side of the drive device 430 facing away from the first connection side 40. In the exemplary embodiment, the transfer device 435 is preferably fluidically connected to the second fluid contact device 305 on the output side by a plurality of tube conductors 465. In the axial direction with respect to the axis of rotation Ra$_n$, the control device 445 is arranged at the opposite end of the first housing 60 to the first connection side 40.

In FIG. 8, the converter 450 is arranged on the upper side of the transfer device 435, i.e. on a side facing the second connection side 45.

The first connection side 40 further comprises a first hollow shaft 470. The input device 430 further comprises a second hollow shaft 475, the second hollow shaft 475 connecting the electric machine 455 to the gear device 460. Thus, the second hollow shaft 475 runs at the engine speed and the first hollow shaft 470 runs at the output speed.

The second hollow shaft 475 is shorter in the axial direction than the first hollow shaft 470, with the first hollow shaft 470 extending substantially longitudinally over the entire drive device 430 and the transfer device 435, with the first hollow shaft 470 extending through the second hollow shaft 475 as well as the drive device 430 and the transfer device 435.

A first optical fiber 480 is centrally disposed in the first hollow shaft 470, the first optical fiber 480 being connected to the first contact device 220 at one (axial) end. At another end, the first optical fiber 480 is optically connected to the converter 450. In operation of the electrical machine 455, the first optical waveguide 480 is arranged to extend along the axis of rotation Ra$_n$ and is torque-proof with respect to the hollow shafts 470, 475. In this case, the first contact device 220 is configured as a rotation transmitter and couples the (rotatable) first contact element 225 to the rotationally fixed first optical waveguide 480.

When an optical signal is introduced into the first contact device 220, the optical signal is transmitted from the first contact device 220 to the converter 450 via the first optical fiber 480. Based on the detected optical signal, the converter 450 converts the optical signal into an electrical data signal. On the output side, the converter 450 is optically connected to the second contact element 421 by a second optical fiber 485. The converter 450 converts the electrical data signal detected by the converter 450 back into a (further) optical signal and the further optical signal is transmitted to the second contact element 421 via the second optical fiber 485.

Radially outwardly of the first optical fiber 480, in alignment with each of the first to fourth power to 210 to 213, an associated bore 490 is disposed in the first hollow shaft 470 and the first connection plate 95 and extends in the axial direction along substantially the entire length of the first hollow shaft 470.

In one aspect, the first to fourth power contacts 210 to 213 are respectively disposed in the bore 490, but an insulating member may be provided in the bore 490 to prevent electrical contact between the first to fourth power contacts 210 to 213 and the electrically conductive connection plate 95 in the first connection plate 95.

A respective first electrical connection 495 is disposed in a respective bore 490 so as to extend in an electrically insulated manner with respect to the first hollow shaft 470. The first electrical connection 495 is at one end electrically connected to the respective associated first to fourth power contacts 210 to 213.

The transfer device 435 has a slip ring unit 500 for each of the first to fourth power contacts, with a first electrical connection 495 at the other end being electrically connected to a respective slip ring unit 500. In addition, another slip ring unit 500 is provided for a ground contact between the first housing 60 and the first hollow shaft 470 or, via the first hollow shaft 470, with the first connection plate 95.

Each slip ring unit 500 is electrically connected to a respective one of the associated fifth to eighth power contacts 410 to 413 by a second electrical connection 505. Thus, for example, the first power contact 210 is electrically connected to the fifth power contact 410 via the first and second electrical connections 495, 505 and the slip ring unit 500.

The control unit 445 is electrically connected to at least two, preferably four, of the first to eighth power contacts 210 to 413 via the slip ring unit 500 by a third electrical connection.

As a result of the first and second electrical connections 495, 505 of the first power contact 210 to the fifth power contact 410, the first terminal is thus applied at the fifth power contact 410 and the second terminal is applied at the sixth power contact 411. The third and fourth power contacts 212, 213 and the seventh and eighth power contacts 412, 413 may be used individually for electrical power transfer from the further electrical (DC or AC) power source so that e.g. a different voltage level is applied at the seventh and eighth power contacts 412, 413 than at the fifth and sixth power contacts 410, 411.

Figure 9:
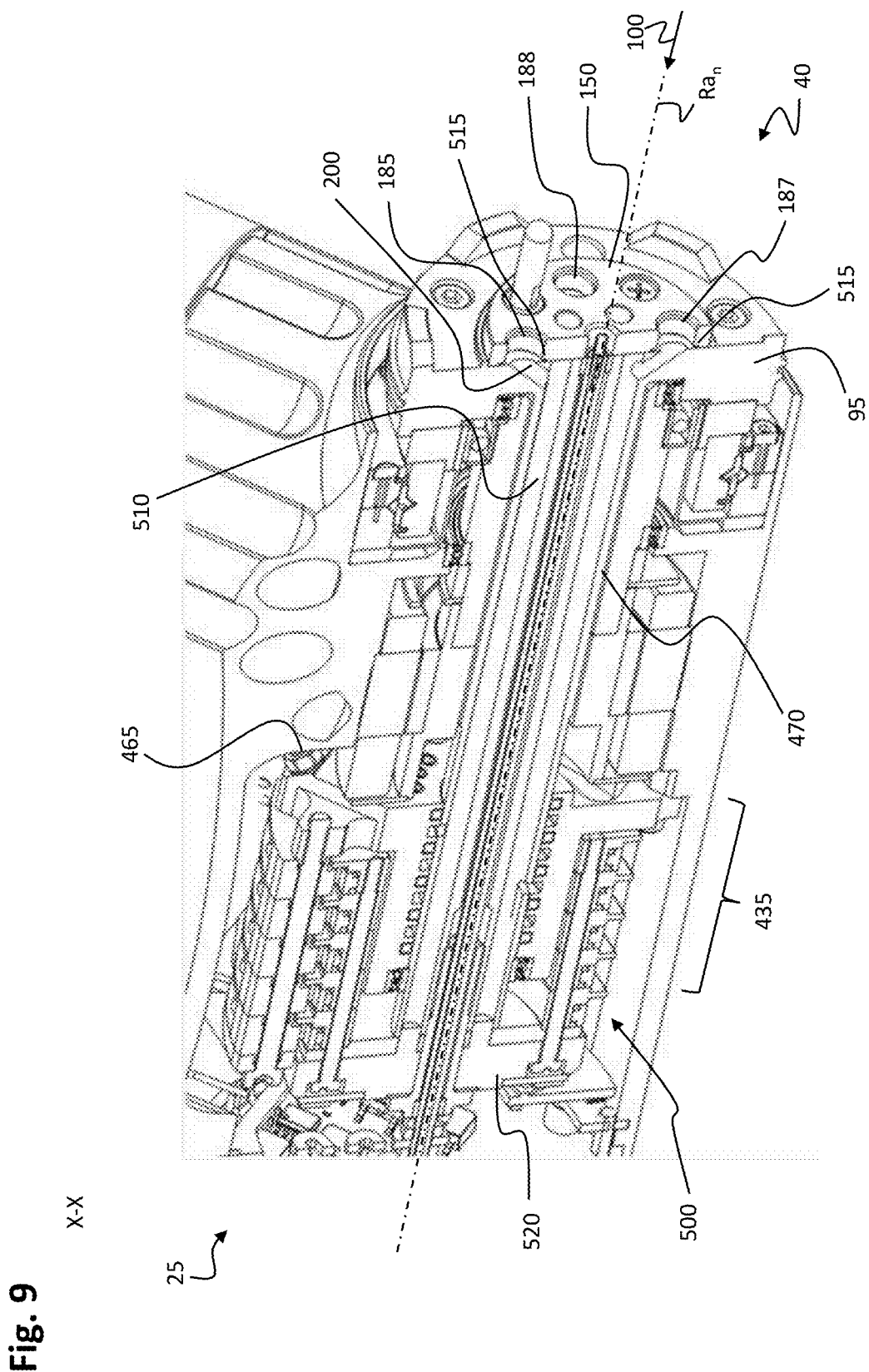
FIG. 9 shows a perspective sectional view along a sectional plane X-X shown in FIG. 3 through the active arm module shown in FIG. 3.

FIG. 9 shows a perspective sectional view along a sectional plane X-X shown in FIG. 3 through an active arm module 25.

In the embodiment, the first connection plate 95 and the first hollow shaft 470 are formed in one piece and of the same material. The first hollow shaft 470 has a smaller outer diameter than the first connection plate 95.

The first fluid connection channel 200 is arranged in the first connection plate 95. The first fluid connection channel 200 opens to the first connection side 40 at the first fluid contact 185. On a side facing away from the first connection side 40, the first fluid connection channel 200 opens into a fluid channel 510. The fluid channel 510 is arranged both in the first hollow shaft 470 running in the axial direction and in the first connection plate 95. The first fluid connection channel 200 runs at an angle to the fluid channel 510 radially from the outside inwards. The fluid channel 510 may be formed as a bore. The fluid channel 510 is arranged radially on the inside of the first fluid contact 185.

A second sealing element 515 is provided on the first connection side 40 for fluidically sealing the fluid connection channel 200 and the fluid channel 510. The second sealing element 515 is arranged axially between the first connection element 150 and the first connection plate 95. The second sealing element 515 may be formed as an O-ring. Thereby, a second sealing element 515 is provided for each first to fourth fluid contact 185, 186, 187, 188, which is arranged concentrically to the respective first to fourth fluid contact 185, 186, 187, 188.

On the axial end of the first hollow shaft 470 facing away from the first connection side 40, the slip ring unit 500 has a closing element 520 which closes the fluid channel 510 on the rear side, so that on the front face of the axial end facing away from the first connection side 40, the fluid channel 510, which is in the form of a bore, is closed in a fluid-tight manner in a simple way. The closing element 520 may be part of the slip ring unit 500.

In the embodiment, a fluid connection channel 200 and a fluid channel 510 are provided for each of the first to fourth fluid contacts 185, 186, 187, 188, wherein the fluid connection channel 200 and the fluid channel 510 are fluidically separated from the other fluid connection channels and fluid channels 510. As a result, fluidic separation of the first to fourth fluid contacts 185 to 188 is also maintained in the first hollow shaft 470 and the first connection plate 95.

The transfer device 435 is embodied as a rotation transmitter and fluidically couples the first hollow shaft 470 with a tube conductor 465 arranged in the first housing interior in a torque-proof manner. Via the transfer device 435, the fluid channel 510 is fluidically connected in each case with a tube conductor 465 respectively having an associated fifth to eighth fluid contact of the second fluid contact device. Thus, a (first to fourth) fluid contact 185, 187 is fluidically connected to an associated and correspondingly arranged (fifth to eighth) fluid contact at the second connection side, respectively. The fluidic connection is maintained even during rotation of the first connection side 40 about the axis of rotation $Ra_n$. Rotation about the rotational axis $Ra_n$ is not limited by the above-described embodiment and may be almost unlimited.

Figure 10:
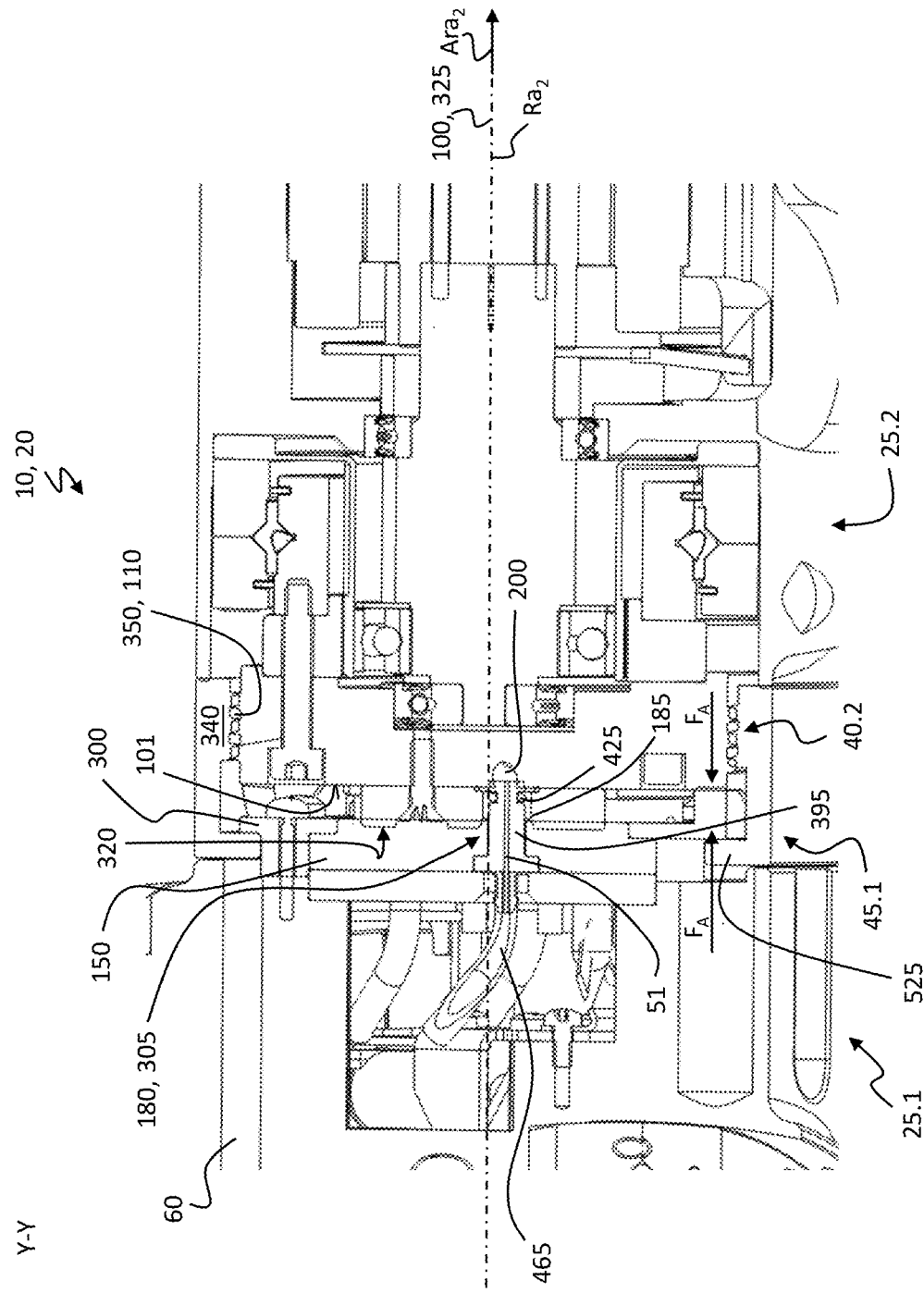
FIG. 10 is a sectional view along a sectional plane Y-Y shown in FIG. 1 through a first active arm module and a second active arm module of the robot arm of the industrial robot shown in FIG. 1.

FIG. 10 shows a sectional view along a sectional plane Y-Y shown in FIG. 1 through the first active arm module 25.1 and the second active arm module 25.2 of the robot arm 20 of the industrial robot 10 shown in FIG. 1.

The connection between the various active and passive arm modules 25, 30 shown in FIG. 1 is effected in the same way as the connection between the second connection side 45.1 of the first active arm module 25.1 and the first connection side 40.2 of the second active arm module 25.2 explained below. For mechanical fastening in the axial direction $Ara_n$, the fastening ring 340 with the internal thread 350 is screwed onto the external thread 110, so that the first contact side 101 and the second contact side 320 are axially pressed onto each other and the first and second contact sides 101, 320 are in surface contact with each other at least in some sections.

For mounting, the first connection side 40.2 of the second active arm module 25.2 and the second connection side 45.1 of the first active arm module 25.1 are moved towards each other along the first and second mounting axes 100, 325 until the contact sides abut. For axially attaching the fastening ring 340, the fastening ring 340 includes a collar 525 that extends radially inward and engages between the second connection plate 300 and the housing 60. As a result, the fastening ring 340 is circumferentially rotatable about the second mounting axis 325 which overlaps with a second axis of rotation Ra$_2$. For mechanical fastening, the fastening ring 340 is screwed onto the external thread 110 and tightened to a predefined tightening torque about the first and second mounting axes 100, 325. On the rear side, the fastening ring 340 is supported by the collar 525. The predefined tightening torque presses the first connection side 40 and the second connection side 45 against each other with an axial force FA resulting from the tightening torque.

In the assembled state, the first and second fluid contact devices 180, 305 further engage with each other to provide a fluid-tight connection between the first connection side 40.2 of the second active arm module 25.2 and the second connection side 45.1 of the first arm module 25.1. Here, for example, the fifth fluid contact 395 engages in the first fluid contact 185. On the circumferential side, the first sealing element 425 arranged in the groove seals the fifth fluid contact 395 with respect to the first fluid contact 185. The second fluid contact 395 opens axially opposite the first fluid connection channel 200.

During operation of the industrial robot 10, e.g. the fluid 51, preferably compressed air or cooling fluid, e.g. for cooling a cutting process, or hydraulic fluid, may be provided via the robot base 15 (cf. FIG. 1), which is first introduced via the robot base 15 into the third passive arm module 30.3 and then into the first active arm module 25.1. The fluid 51 is transferred and forwarded via the first active arm module 25.1 from the first connection side to the second connection side 45.1 of the first active arm module 25.1. In this case, the forwarding takes place via the first connection side 40.1 of the first active arm module 25.1 (in the following, reference is made to FIGS. 1, 9 and 10 together), via the fluid connection channel 200 and the fluid channel 510, the transfer device 435 and the tube conductor 465 to the second fluid contact device 305. Through the first and second fluid contact devices 180, 305 being in contact, the second active arm module 25.2 is fluidically connected to the second connection side 45.1 of the first active arm module 25.1 at the first connection side 40.2 of the second active arm module 25.2. The fluid 51 is transferred via the second active arm module 25.2 as preivously described in the first active arm module 25.1 to the second connection side 45.2 of the second active arm module 25.2. This allows the fluid 51 to be transferred from the robot base 15 towards the end effector.

Depending on the provision of the fluid 51 and the circuitry of the robot base 15, the individual first and second fluid contacts 185, 395 may have the same fluid 51 flowing through them in parallel, or the individual first and second fluid contacts 185, 395 may be fluidically separated from each other and/or have fluid 51 flowing through them in different directions. Also, different fluids 51 may be directed through the fluidically separated fluid channels and fluid connection channels.

Thus, for example, in the industrial robot 10 shown in FIG. 1, the end effector may be supplied via up to four separately switchable fluidic connections, depending on the circuitry of a fluid guide in the robot base 15 and the embodiment of the end effector. This means that the end effector may e.g. be controlled from the robot base 15 by magnetic valves.

Also, two or a plurality of fluid connection channels and fluid channels may be connected in parallel so that, for example, a particularly high mass flow of fluid 51 may be transferred from the robot base 15 to the end effector via the first and second fluid contact devices 180, 305.

Figure 11:
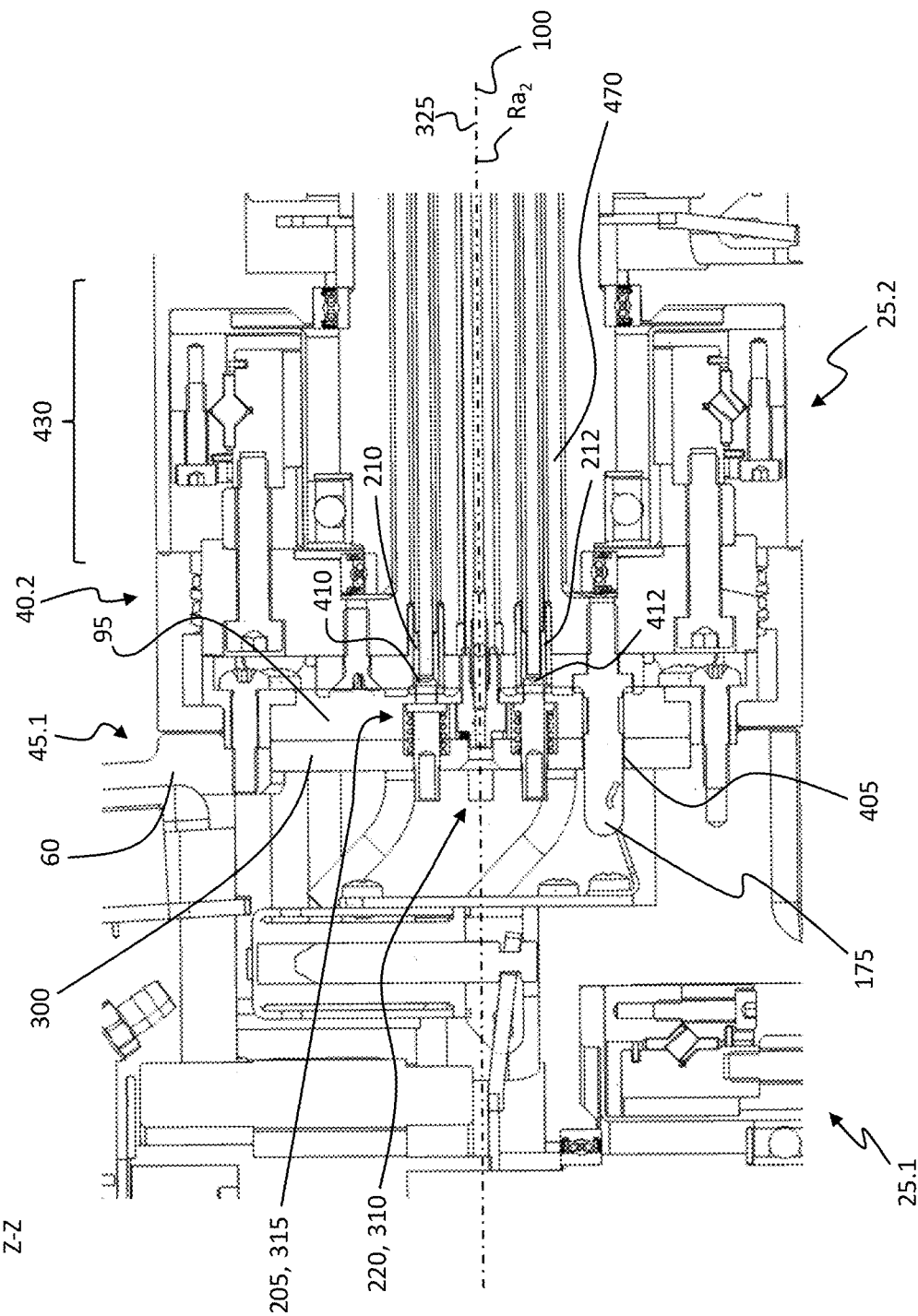
FIG. 11 is a sectional view along a sectional plane Z-Z shown in FIG. 1 through the first and second active arm modules shown in FIG. 1.

FIG. 11 shows a sectional view along a sectional plane Z-Z shown in FIG. 1 through the first and second active arm modules 25.1, 25.2 shown in FIG. 1.

In the assembled state of the second connection side 45.1 of the first arm module 25.1 to the first connection side 40.2 of the second active arm module 25.2, the pin 175 engages in the second pin receptacle 405 associated with it. In the embodiment, the second connection plate 300, the first connection plate 95, and the pin 175 are formed of an electrically conductive material. Further, the second connection side 45.1 of the first active arm module 25.1 is electrically connected to a ground contact, e.g. via the robot base 15. The pin 175 electrically contacts the second pin receptacle 405, and thus not only provides an orientation of the first connection side 40.2 of the second active arm module 25.2 to the second connection side 45.1 of the first active arm module 25.1 about the second axis of rotation Ra$_2$, which overlaps with the first and second mounting axes 100, 325, but also ensures a ground contact via the electrically conductive first hollow shaft 470, the transfer device 435 and the first housing 60 to the second connection side 45.2 of the second active arm module 25.2.

Similarly, the first contact device 220 contacts the second contact device 310 so that the optical signal may be transmitted from the robot base 15 to the second active arm module 25.2 via the third passive arm module 30.3, the first active arm module 25.1, and then via the second connection side 45.1 of the first active arm module 25.1 and the first connection side 40.2 of the second active arm module 25.2. The optical signal is further transmitted in the active arm module 25, e.g. the second active arm module 25.2 as explained in FIG. 8, to the second connection side 45.2 of the second active arm module 25.2.

Similarly, the first power contact device 205 contacts the second power contact device 315, with the fifth to eighth power contacts 410 to 413 abutting on the respective associated first to fourth power contacts 210 to 213 at the front end. On the rear side, the fifth to eighth power contact 410 to 413 may be spring-mounted in the second connection side 45.1 of the first active arm module 25.1 and pressed against the respectively assigned second to fourth power contact 210 to 213 by a biasing force. The electrical power may thereby be used to operate the drive device 430 of the first active arm module 25.1 and to operate the control device 445.

Further, the electrical power may at least partially be transmitted to the second active arm module 25.2 via the second connection side 45.1 of the first active arm module 25.1 and the first connection side 40.2 of the second active arm module 25.2. The second active arm module 25.2 also provides electrical power to the second connection side 45.2 of the second active arm module 25.2 via the electrical connection between the first and second power contact device 205, 315 and the second active arm module 25.2.

As a result, electrical power may be transmitted from the robot base 15 via the active arm modules 25 and the passive arm modules 30 in the direction of the end effector via the connection sides. In each case, the active arm module 25 may additionally be supplied with the electrical power for operating the control unit 445, the converter 450 and the drive device 430, and electrical power may also be forwarded for operating the end effector, or electrical power may be transmitted for operating additional units or peripheral devices of the robot arm 20.

Figure 12:
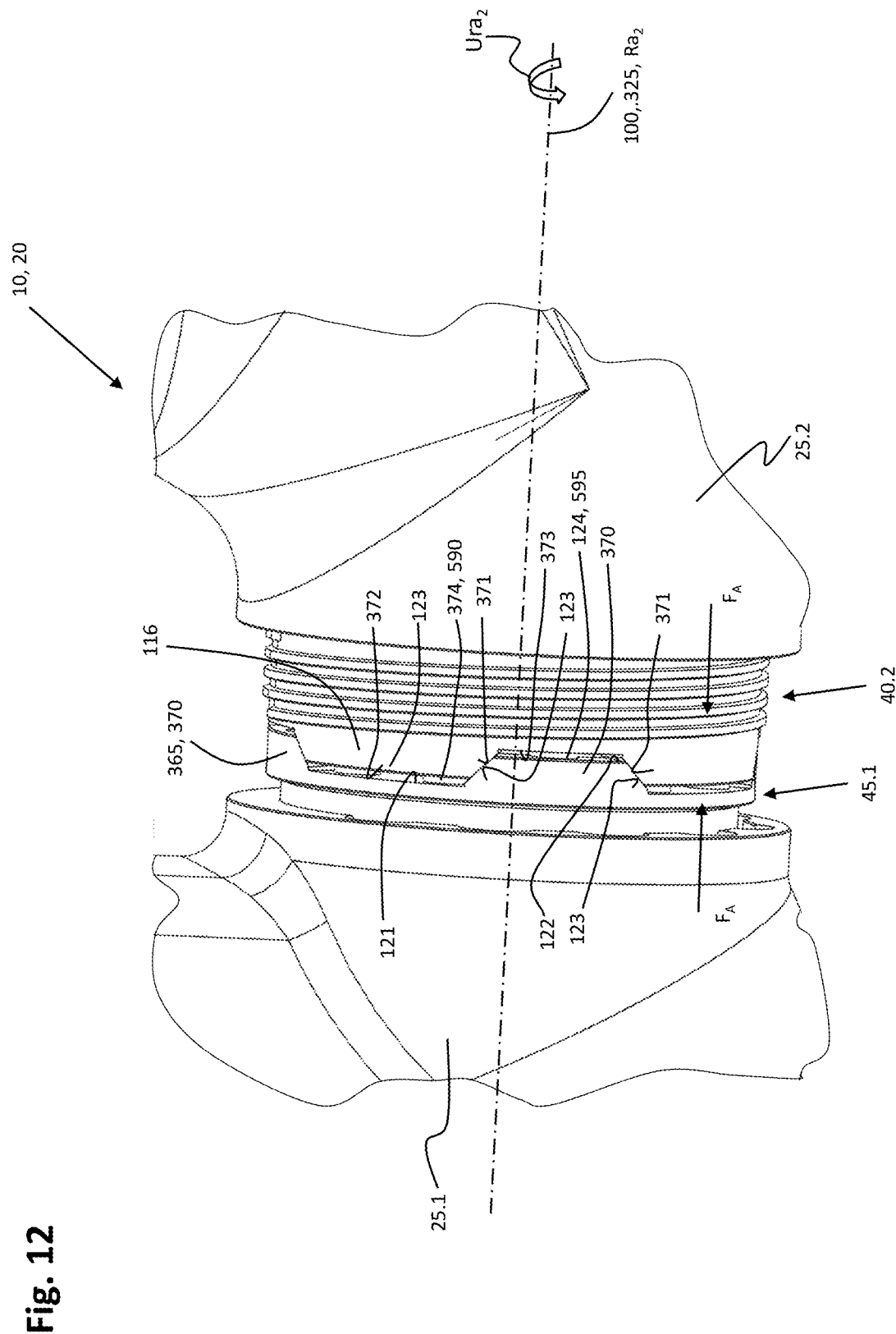
FIG. 12 shows a section marked V in FIG. 1 of the industrial robot shown in FIG. 1.

FIG. 12 shows a section V of the industrial robot 10 shown in FIG. 1.

In order to rotate the second active arm module 25.2 relative to the first active arm module 25.1 about the second axis of rotation $Ra_2$ during operation or activation of the drive device 430 (hidden in FIG. 12) and to exchange a torque between the first active arm module 25.1 and the second active arm module 25.2, the first face gearing 116 and the second face gearing 365 engage with each other. The first face gearing 116 and the second face gearing 365 are formed at least complementary to each other, preferably correspondingly to each other. Preferably, the first and second face gearings 116, 365 are formed as Hirth joints so that when the first connection side 40.2 of the second active arm module 25.2 is mounted to the second connection side 45.1 of the first active arm module 25.1, said two connection sides 40.2, 45.1 center relative to each other in radial direction to the first and second mounting axes 100, 325, which then correspond to the second axis of rotation $Ra_2$ in the mounted state. Pre-centering may be accomplished by engagement of the pin 175 with the pin receptacle 405 (shown in FIG. 10).

During centering, the first tooth flank 123 and the second tooth flank 371 slide against each other and align the first connection side 40.2 and the second connection side 45.1 both in the circumferential direction $Ura_2$ and in the radial direction with respect to the first and second mounting axes 100, 325. In the assembled state of the robot arm 20, two respective first and second tooth flanks 123, 371 arranged opposite each other in the circumferential direction abut on each other.

Further, in the assembled state of the robot arm 20, the first tooth 123 engages in the second tooth space 372 between two second teeth 370 that are closest in the circumferential direction. Exemplarily, the first face gearing 116 and the second face gearing 365 are flank-centered such that a first axial gap 590 is arranged between the first tooth head 221 and the second tooth root 372.

Similarly, the second tooth 370 engages the first tooth space 124. The second tooth tip 373 is axially spaced apart from the first tooth root 122 by a second axial gap 595. The transmission of the resulting axial force FA between the first face gearing 116 and the second face gearing 365 thus takes place exclusively via the first and second tooth flanks 123, 371. The torque to be transmitted between the first connection side 40.2 and the second connection side 45.1 is also transmitted essentially exclusively via the first and second tooth flanks 123, 371, as well. This avoids mechanical stress on the contact device, the power contact device and the fluid contact device in the circumferential direction.

Figure 13:
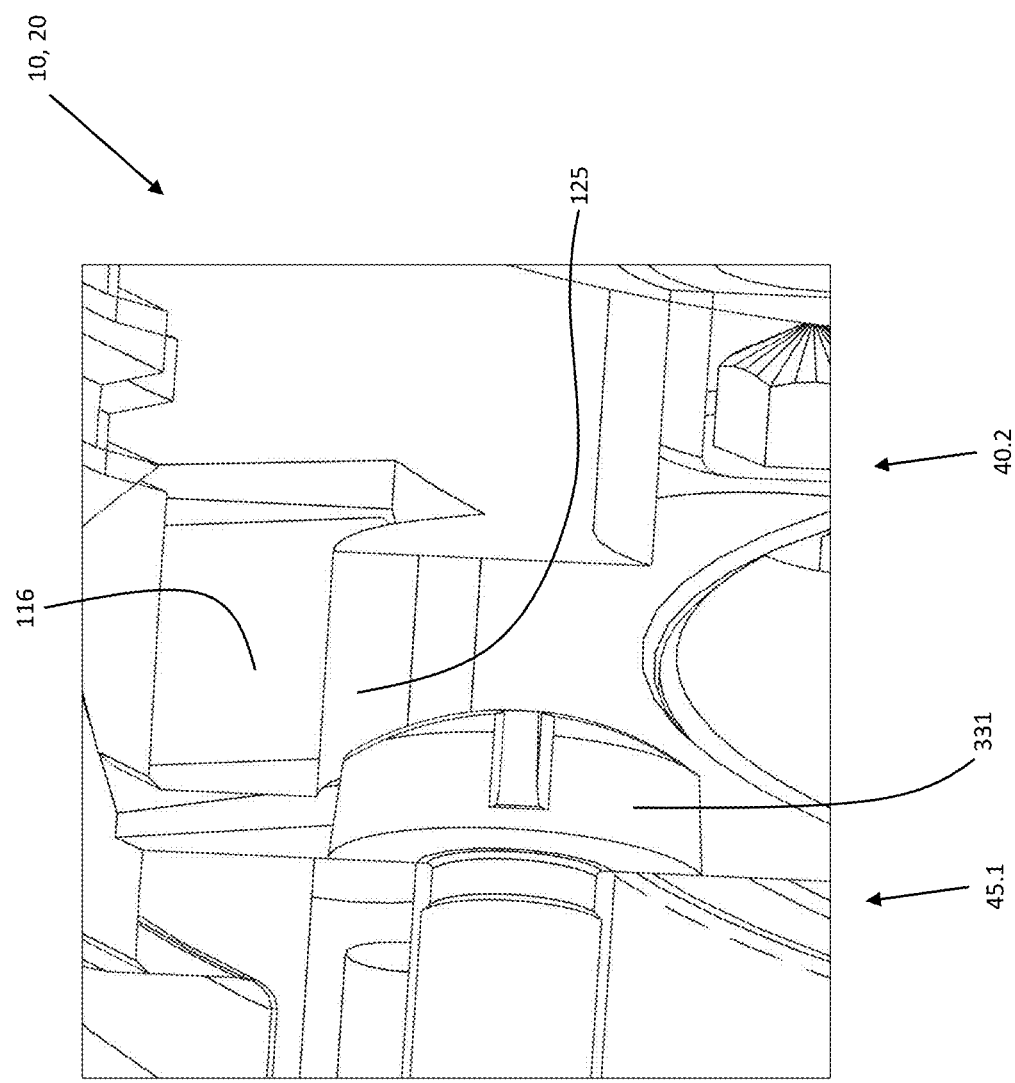
FIG. 13 shows a sectional view along a sectional plane W-W shown in FIG. 1 through the industrial robot shown in FIG. 1.

FIG. 13 shows a sectional view along a sectional plane W-W shown in FIG. 1 through the industrial robot 10 shown in FIG. 1.

In FIG. 13, the sectional surface is not closed. The first indentation 125 is at least in sections embodied corresponding to the second screw head 331 of the third fastening 330. The second screw head 331 engages in the first indentation 125, wherein the second screw head 331 is arranged spaced apart in the axial direction from the indentation bottom of the first indentation 125. This prevents overdetermination at the first and second connection sides 40, 45.

FIGS. 11 to 13 are both described in the following. Centering in the circumferential direction and radial direction ensures reliable insertion of the first and second contact devices 220, 310 as well as of the first and second fluid contact devices 180, 305 and of the first and second power contact devices 205, 315. Alignment in the circumferential direction and encoding in the circumferential direction are thereby achieved by engaging the pin 175 with the second pin receptacle 405.

If, for example, when the drive device 430 of the second active arm module 25.2 is activated, the first connection side 40.2 of the second active arm module 25.2 is rotated relative to the first housing 60 of the second active arm module 25.2 and relative to the second connection side 45.1 of the first active arm module 25.1.

Depending on the control of the individual first to sixth active arm modules 25.1 to 25.6 of the industrial robot 10 shown in FIG. 1, the industrial robot 10 may be controlled accordingly about all six first to sixth rotational axes $Ra_1$ to $Ra_2$. In this case, both the electrical power, the fluid 51 and the optical signal for data communication, which is transmitted in accordance with the EtherCAT standard, may e.g. be transmitted from the robot base 15 to the end effector on the inside of the robot arm 20 without limiting a rotation about the rotational axis $Ra_n$.

The industrial robot 10 shown in FIGS. 1 to 13, in particular the active arm modules 25, have the advantage that they are standardized and/or uniform and/or identical in their embodiment and may be easily mounted on one another with the individual active and/or passive arm modules 25, 30 and the respective correspondingly embodied first and second connection sides 40, 45 depending on the required rotational axes $Ra_n$.

Figure 14:
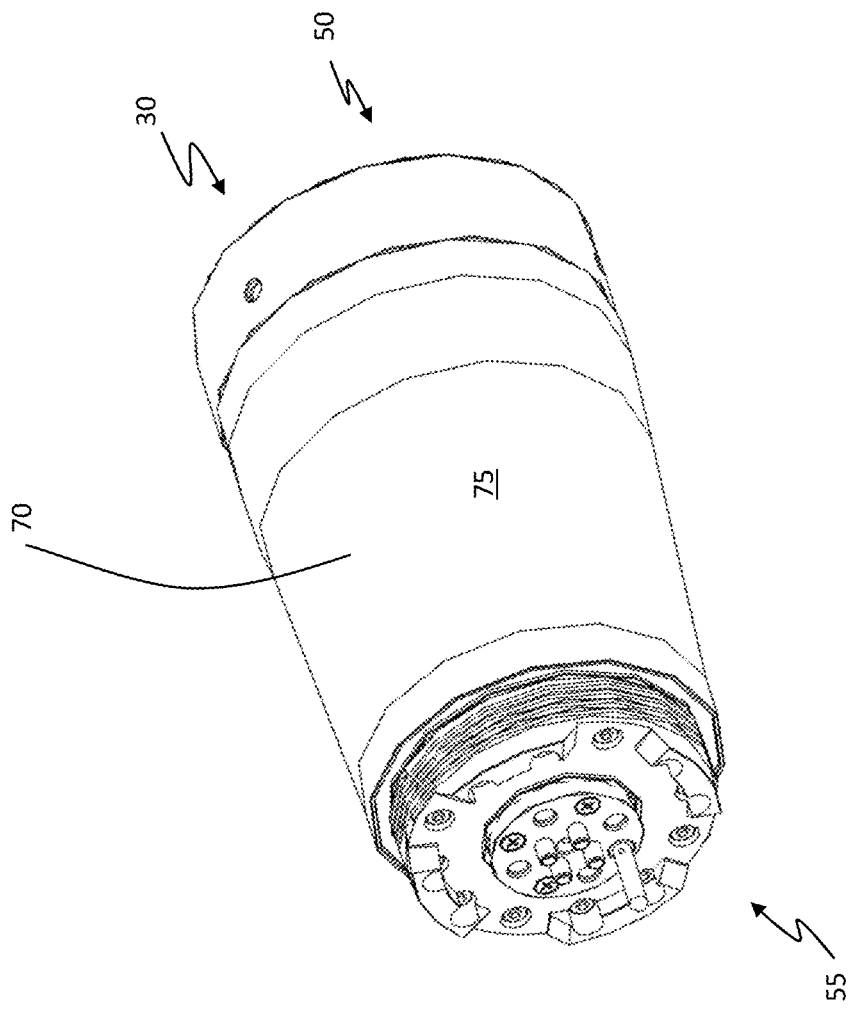
FIG. 14 depicts a perspective view of a passive arm module according to a first embodiment.

FIG. 14 shows a perspective view of a passive arm module 30 according to a first embodiment.

As explained with respect to FIG. 1, passive arm modules 30 may be provided in addition to the active arm modules 25. For example, the passive arm module 30 shown in FIG. 14 may be the second passive arm module 30.2 shown in FIG. 1.

The passive arm module 30 is essentially identical to the active arm module 25. The third connection side 50 is fluid-connected, data-connected, preferably optically, and power-connected to the fourth connection side 55 within the second housing interior 75 of the respective passive arm module 30.

Deviating from this, however, both the third connection side 50 and the fourth connection side 55 are connected to the second housing 70 in a torque-proof manner. In the embodiment, the fourth connection side 55 is formed analogously to the first connection side of the active arm module, so that reference is made to FIGS. 3 and 4 for a detailed description. The third connection side 50 is formed analogously to the second connection side of the active arm module, so that reference is made here to the detailed description of FIGS. 5 to 7.

Furthermore, the passive arm module 30 also eliminates the first and second transfer devices, the converter, the control device, and the drive device. As a result, the first fluid contact device of the third connection side 50 is fluidically connected to the second fluid contact device of the fourth connection side 55 directly by a fluid connection, the first contact device is optically connected to the second contact device preferably directly by a further optical waveguide, and the first power contact device is power-electrically connected to the second contact device directly, e.g. by electrical cables.

Figure 15:
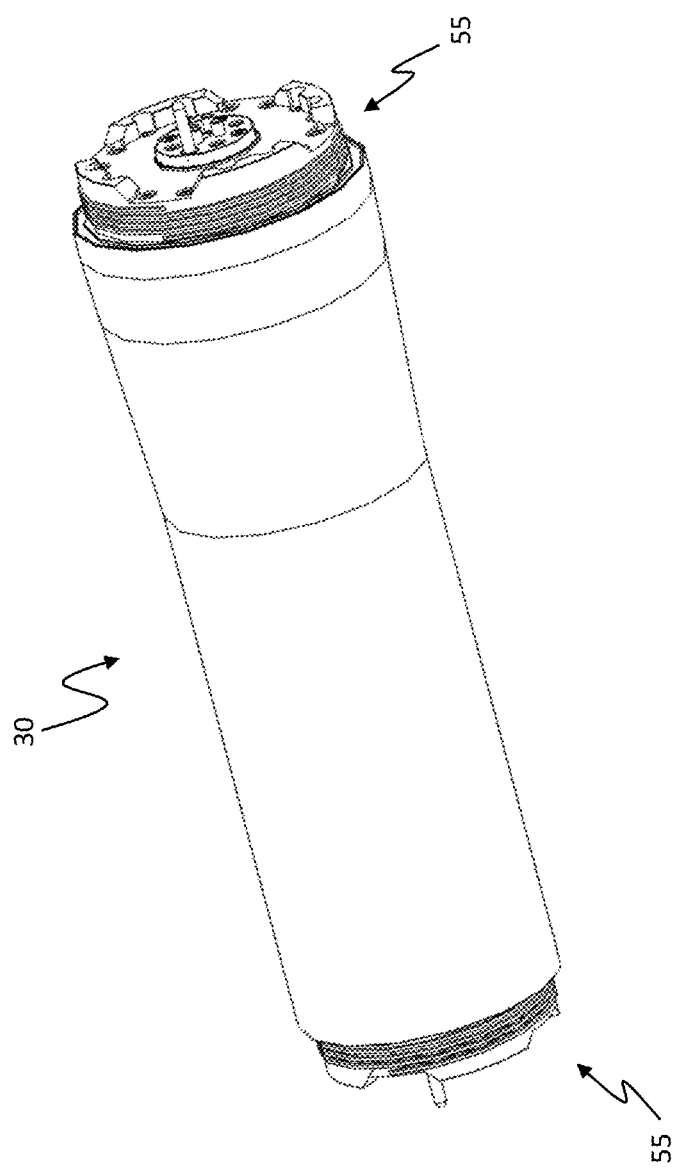
FIG. 15 shows a perspective view of a passive arm module according to a second embodiment.

FIG. 15 shows a perspective view of a passive arm module 30 according to a second embodiment.

The passive arm module 30 shown in FIG. 15 is essentially identical to the passive arm module 30 shown in FIG. 14. In contrast, the passive arm module 30 shown here comprises two fourth connection sides 55, each of which is formed analogously to the first connection side of the active arm module. The arm module 30 shown in FIG. 15 may e.g. be used as the first arm module 30.1 of the robot arm 15 shown in FIG. 1.

Figure 16:
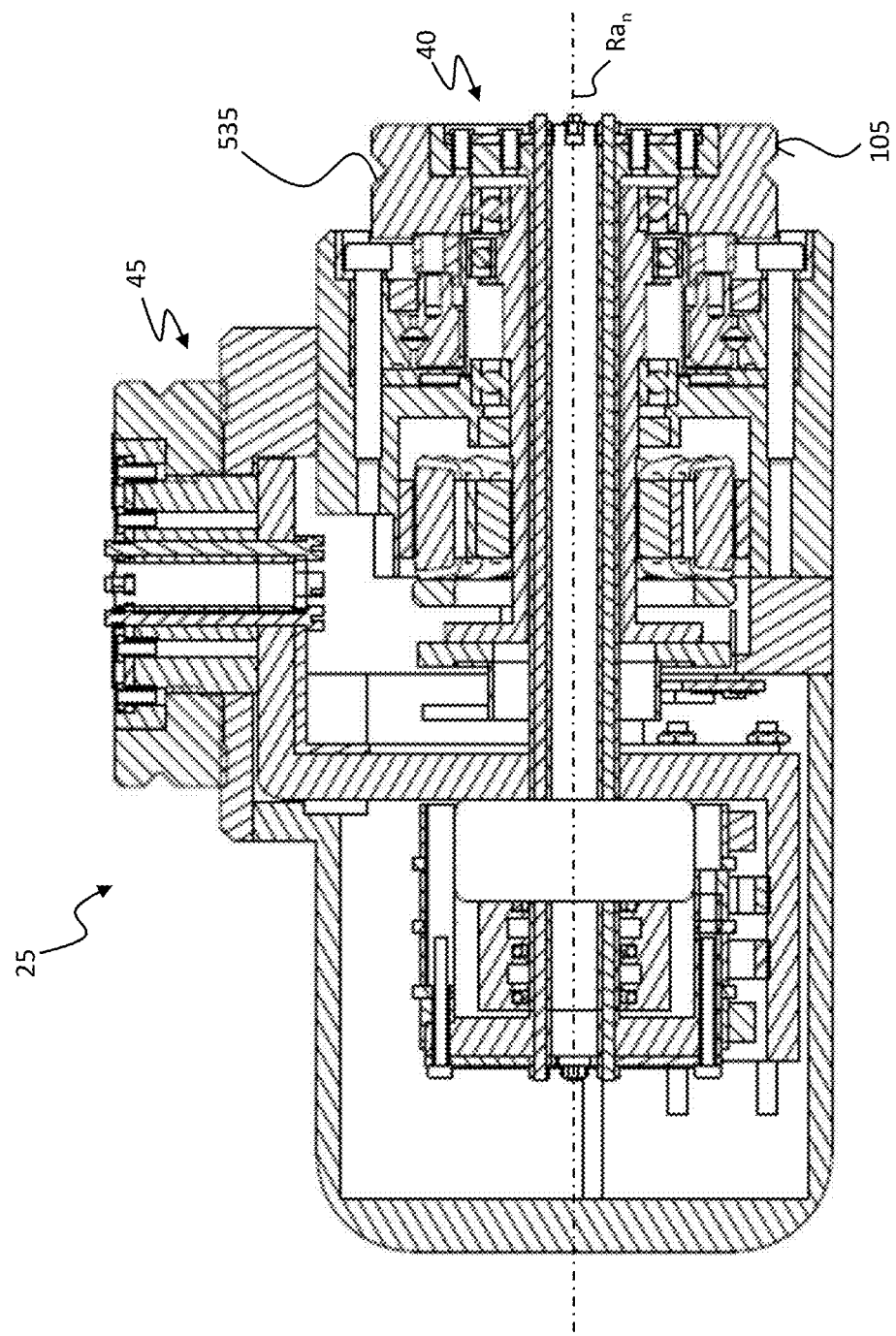
FIG. 16 is a perspective view of an active arm module according to a second embodiment.

FIG. 16 shows a sectional view of an active arm module 25 according to a second embodiment.

The active arm module 25 is substantially identical in embodiment to the active arm module 25 of the industrial robot 10 shown in FIGS. 1 to 13. In the following, only the differences between the active arm module 25 shown in FIG. 16 and the embodiment of the active arm module 25 shown in FIGS. 1 to 13 will be discussed. The first connection side 40 and the second connection side 45 are formed identically to each other. For example, in the embodiment of the active arm module 25 shown in FIG. 16, the second connection side 45 is formed substantially like the first connection side 40 explained in FIGS. 1 to 13. Thus, both connection sides 40, 45 are exemplarily formed as females. Further, the first and second face gearings on the two connection sides 40, 45 are omitted. Likewise, the fastening ring on the second connection side 45 is dispensed with.

Deviating from FIGS. 1 to 13, the first outer circumferential side 105 is substantially cylindrical in shape at the first outer circumferential side 105, instead of having the external thread, wherein preferably an exemplary V-shaped groove 535 is arranged in the first outer circumferential side 105. The groove 535 is arranged circumferentially about the respective axis of rotation $Ra_n$. In order to connect several active arm modules 25 to one another, the robot arm additionally comprises a connector between each two active arm modules 25 to be connected.

Figure 17:
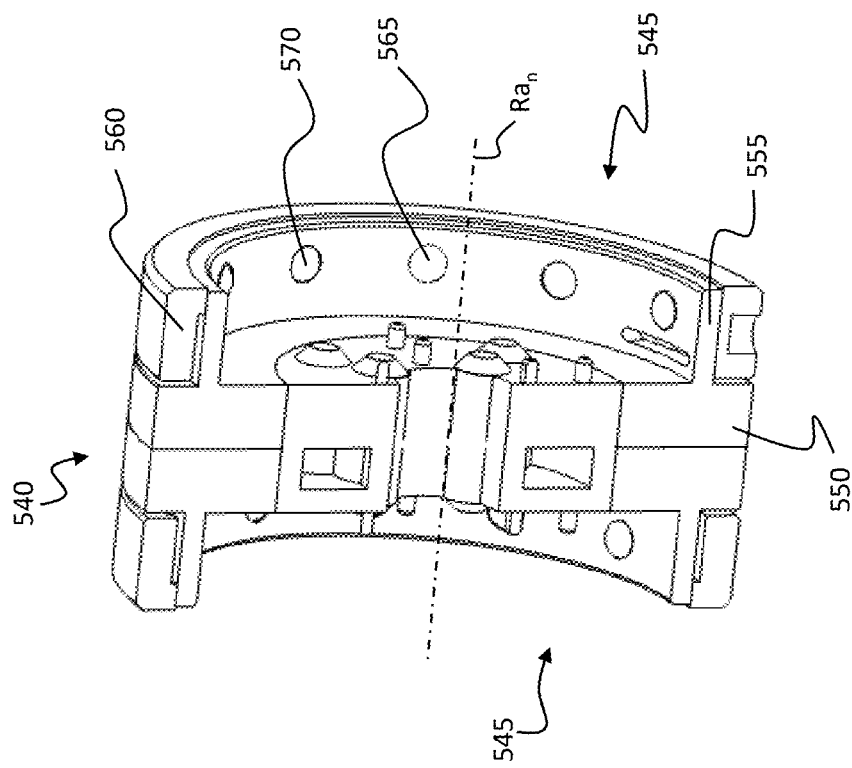
FIG. 17 shows a longitudinal section through a connector of a robot arm.

FIG. 17 shows a longitudinal section through connector 540.

The connector 540 has a connector connection side 545 on both sides in each case, with the connector connection sides 545 being formed identically to one another. The connector 540 thereby forms a kind of passive arm module, which is formed to be particularly short in the axial direction. The connector connection side 545 is exemplarily embodied as a male at least complementary, preferably corresponding to the first connection side 40 or the second connection side 45 of the active arm module shown in FIG. 16.

In order to mechanically connect two active arm modules 25 shown in FIG. 16, each connector connection side 545 has a bridge 555 arranged on the outside of a connector housing 550, which is cylindrical in shape. A clamping ring 560, which may be rotated about the axis of rotation $Ra_n$, is arranged radially on the outside of the bridge 555. First ball receptacles 565 are provided at regular intervals in the bridge 555, with one ball 570 being arranged in each ball receptacle 565.

Figure 18:
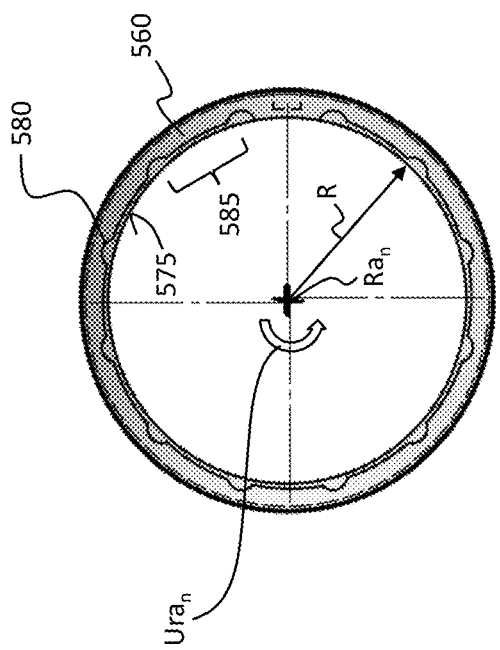
FIG. 18 shows a cross-section through a clamping ring of the connector shown in FIG. 15.

FIG. 18 shows a cross-sectional view of the connector clamping ring 560 shown in FIG. 17.

At a third inner circumferential side 575, the clamping ring 560 in each case comprises a second ball receptacle 580 at regular intervals, which is closed towards the outside. A conical section 585 adjoins each of these in the circumferential direction $Ura_n$ with respect to the axis of rotation $Ra_n$, the conical section 585 tapering in its radius R in the circumferential direction with respect to the axis of rotation $Ra_n$.

In the following, FIGS. 16 to 18 are explained in conjunction. For assembly, the connector 540 is slid onto one of the two connection sides 40, 45 of the active arm module 25 by a connector connection side 545 shown in FIG. 16. In doing so, the first or second connection side 40, 45 is data, power and fluid-connected to the connector 540. The balls 570 engage the groove 535 for mechanical fastening. Once the connector 540 has reached an end position by having the first or second contact side abut a base of the connector connection side 545, the clamping ring 560 is rotated in the circumferential direction $Ura_n$. The conical section 585 forces the balls 570 radially inward into the groove 535. This creates a frictional connection between the connector 540 and the connector connection side 40, 45. The other connection side 40, 45 of the next active arm module 25 is then inserted at the other connector connection side 545, and the connection of the further active arm module 25 to the connector 540 is carried out analogously as previously descrbed. In this way, two active arm modules 25 may be connected to each other.

Alternatively, instead of the active arm module 25 shown in FIG. 16, the passive arm module may also be embodied at the third and fourth connection sides, as shown in FIG. 16. In this case, two identically embodied third and fourth connection sides are provided at a passive arm module, which are formed identically to the first connection side and may also be connected to the connector 540 by a corresponding connection side 40, 45 of the active arm module 25.

Likewise, a torque may be transmitted via the connector 540, so that with the (active) first connection side 40 the connector 540, and also the next active or passive arm module 25,30 attached to the connector 540, may be rotated. This embodiment has the advantage that the arm modules 18 may be mounted to each other particularly quickly.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

List of reference numerals: 10-95

| | | | |
|---|---|---|---|
| 10 | industrial robot | 20 | robot arm |
| 15 | robot base | 30 | passive arm module |
| 25 | active arm module | 30.1 | first passive arm module |
| | first active arm module | 30.2 | second passive arm module |
| 25.1 | second active arm module | 30.3 | third passive arm module |
| 25.2 | third active arm module | 35 | end effector connection side |
| 25.3 | fourth active arm module | 45 | second connection side |
| 25.4 | fifth active arm module | 45.1 | second connection side of first active arm module |
| 25.5 | sixth active arm module | | |
| 25.6 | first connection side | 45.2 | second connection side of second active arm module |
| 40.1 | first connection side of first active | | |

TABLE 1-continued

List of reference numerals: 10-95

| | | | |
|---|---|---|---|
| | arm module | 45.3 | second connection side of third active arm module |
| 40.2 | first connection side of second active arm module | 45.4 | second connection side of fourth active arm module |
| 40.3 | first connection side of third active arm module | 45.5 | second connection side of fifth active arm module |
| 40.4 | first connection side of fourth active arm module | 45.6 | second connection side of sixth active arm module |
| 40.5 | first connection side of fifth active arm module | 55 | fourth connection side |
| 40.6 | first connection side of sixth active arm module | 55.1 | fourth connection side of first passive arm module |
| 50 | third connection side | 55.2 | fourth connection side of second passive arm module |
| 50.2 | third connection side of second passive arm module | 55.3 | fourth connection side of third passive arm module |
| 50.3 | third connection side of third passive arm module | 80 | first housing portion |
| 60 | first housing | 85 | second housing portion |
| 65 | first housing interior | 90 | side face |
| 70 | second housing | 95 | first connection plate |
| 75 | second housing interior | | |

TABLE 2

List of reference numerals: 100-365

| | | | |
|---|---|---|---|
| 100 | first mounting axis | 200 | first fluid channel |
| 101 | first contact side | 205 | first power contact device |
| 105 | first outer circumferential side | 210 | first power contact |
| 110 | external thread | 211 | second power contact |
| 115 | first front face | 212 | third power contact |
| 116 | first face gearing | 213 | fourth power contact |
| 120 | first tooth | 215 | third circular path |
| 121 | first tooth tip | 220 | first contact device |
| 122 | first tooth root | 225 | first contact element |
| 123 | first tooth flank | 230 | contact receptacle |
| 124 | first intermediate space | 235 | first power contact receptacle |
| 125 | first indentation | 240 | first contact surface |
| 130 | first inner tooth circumferential side | 245 | second contact surface |
| 140 | first fastening | 300 | second connection plate |
| 145 | first circular path | 305 | second fluid contact device |
| 150 | first connection element | 310 | second contact device |
| 155 | second front face | 315 | second power contact device |
| 160 | second fastening | 320 | second contact side |
| 165 | second circular path | 325 | second mounting axis |
| 170 | first pin receptacle | 330 | third fastening |
| 175 | pin | 331 | second screw head |
| 180 | first fluid contact device | 335 | fourth circular path |
| 185 | first fluid contact | 340 | fastening ring |
| 190 | tube receptacle | 345 | second inner circumferential side |
| 195 | sealing surface | 350 | internal thread |
| 355 | second outer circumferential side (of the fastening ring) | | |
| 360 | tool holder | 365 | second face gearing |

TABLE 3

List of reference numerals: 370-595

| | | | |
|---|---|---|---|
| 370 | second tooth | 461 | drive flange |
| 371 | second tooth flank | 465 | tube conductor |
| 372 | second tooth root | 470 | first hollow shaft |
| 373 | second tooth tip | 475 | second hollow shaft |
| 374 | second intermediate space | 480 | first optical waveguide |
| 375 | second indentation | 485 | second optical waveguide |
| 380 | third front face | 490 | bore |
| 385 | fourth front face | 495 | first electrical connection |
| 390 | connection receptacle | 500 | slip ring unit |
| 395 | second fluid contact | 505 | second electrical connection |
| 396 | tube portion | 510 | second fluid channel |
| 400 | fifth circular path | 515 | second sealing element |
| 405 | second pin receptacle | 520 | second connection element |
| 409 | second power contact receptacle | 525 | collar |
| 410 | fifth power contact | 530 | fluid |
| 411 | sixth power contact | 535 | groove |
| 412 | seventh power contact | 540 | connector |
| 413 | eighth power contact | 545 | connection side of connector |
| 415 | third contact surface | 550 | connector housing |
| 420 | sixth circular path | 555 | bridge |
| 421 | second contact element | 560 | clamping ring |
| 425 | first sealing element | 565 | first ball receptacle |
| 430 | drive device | 570 | ball |
| 435 | transfer device | 575 | third inner circumferential side |
| 445 | control device | 580 | second ball receptacle |
| 450 | converter | 585 | conical section |
| 455 | electrical machine | 590 | first axial gap |
| 460 | gear device | 595 | second axial gap |
| $F_A$ | axial force | | |

The invention claimed is:

1. An arm module for a modular robot arm of an industrial robot, comprising:
a first housing, a first connection side of the arm module, and a second connection side of the arm module;
wherein the first connection side of the arm module comprises a first connection plate, a first fluid contact device, and a first contact device, and the second connection side of the arm module is mechanically connected to the first housing in a torque-proof manner and comprises a second connection plate,
wherein the first fluid contact device and the first contact device are arranged on the first connection plate and extend in parallel to a first mounting axis,
wherein the first connection side of the arm module is connectable to a second connection side of a further arm module of the robot arm,
wherein the second connection side of the arm module is connectable to a first connection side of another further arm module of the robot arm, and
wherein a fluid, compressed air or hydraulic fluid is transmittable via the first fluid contact device and an optical and/or electrical signal is transmittable via the first contact device for transmitting data;

wherein an external thread is circumferentially arranged around the first mounting axis on a first outer circumferential side of the first connection plate, wherein the second connection plate is circumferentially embraced by a fastening ring, and the fastening ring comprises an internal thread on an inner circumferential side corresponding to the external thread, and wherein the fastening ring is connected to the first housing of the arm module in an axially fixed manner and so as to be rotatable about a second mounting axis;

wherein a first face gearing is arranged on the first connection plate, wherein the first face gearing has a plurality of first teeth arranged offset in the circumferential direction, wherein each of the first teeth comprises a first tooth flank, wherein each of the first tooth flanks of the first teeth is oriented toward the first mounting axis with at least one direction, wherein the second connection plate includes a second face gearing, and wherein the second face gearing has a plurality of second teeth that are circumferentially offset from one another;

wherein each of the second teeth includes a second tooth flank, wherein a transmission of an axial force via the first face gearing takes place exclusively via the first tooth flanks and/or a transmission of the axial force via the second face gearing takes place exclusively via the second tooth flanks, wherein a torque is transmitted at the first connection side of the arm module essentially exclusively via the first tooth flanks and/or the torque is transmitted at the second connection side of the arm module essentially exclusively via the second tooth flanks; and wherein the first face gearing and the second face gearing are formed complementary and/or corresponding to each other.

2. The arm module according to claim 1, wherein the first face gearing and/or the second face gearing are configured as a Hirth joint.

3. The arm module according to claim 1, wherein the second face gearing is arranged internally adjacent to the fastening ring.

4. The arm module according to claim 1, wherein the second connection plate and the second face gearing are formed integrally and of one material piece.

5. The arm module according to claim 1, wherein the first tooth has a first indentation extending in an axial direction along the first mounting axis, wherein the second connection side of the arm module is connected to the first housing in a torque-proof manner by a third fastening, wherein the third fastening protrudes above the second connection plate, and wherein the first indentation is at least in sections configured corresponding to the third fastening.

6. The arm module according to claim 1, wherein the second connection side of the arm module comprises a second fluid contact device configured corresponding to the first fluid contact device, a second power contact device configured corresponding to a first power contact device, and a second contact device configured corresponding to the first contact device, wherein the second fluid contact device, the second power contact device, and the second contact device are arranged on the second connection plate, and the second fluid contact device, the second power contact device, and the second contact device extend along the second mounting axis, wherein the first fluid contact device is directly or indirectly fluid-connected to the second fluid contact device in the first housing and the first contact device is directly or indirectly data-connected to the second contact device in the first housing for transmitting the optical and/or electrical signal, wherein the first power contact device and the second power contact device are directly or indirectly electrically connected to each other in the first housing, and wherein the fluid, compressed air or hydraulic fluid is transmittable via the second fluid contact device, the electrical power via the second power contact device, and the optical and/or electrical signal via the second contact device.

7. The arm module according to claim 1, wherein the first contact device comprises a plurality of first contact elements arranged circumferentially with respect to the first mounting axis, wherein the first contact elements are arranged concentrically with regard to the first mounting axis, and wherein the electrical data signal is transmittable across the first contact element.

8. The arm module according to claim 1, wherein the first fluid contact device comprises a plurality of first fluid contacts arranged at an offset with respect to the first mounting axis in the circumferential direction, wherein the first fluid contacts are arranged concentrically with regard to the first mounting axis and are configured identically to each other, and wherein the first fluid contacts are fluidically separated from each other and/or at least partially fluid-connected in parallel.

9. The arm module according to claim 8, wherein a second fluid contact device comprises at least one second fluid contact, wherein the second fluid contact extends in parallel to the second mounting axis, wherein the first fluid contact is connected to the second fluid contact for exchanging a fluid, wherein the first fluid contact comprises a tube receptacle and the second fluid contact comprises a tube portion, and wherein the tube receptacle and the tube portion are configured to correspond to each other at least circumferentially.

10. The arm module according to claim 1, comprising:

a pin spaced apart and in parallel to the first mounting axis, wherein the pin is electrically and mechanically connected to the first connection plate and protrudes above the first connection plate; and wherein the pin is configured to engage a pin receptacle of the further arm module for encoding and/or positioning the arm module with respect to the further arm module, and/or wherein the second connection plate comprises a second pin receptacle, wherein the second pin receptacle is configured to correspond to the pin and is configured to receive a second pin of another arm module.

11. The arm module according to claim 1, wherein the arm module is configured as an active arm module, and comprising a drive device, wherein the first connection side of the arm module is rotatably mounted about the first mounting axis and is connected to the drive device in a torque-locking manner, and wherein the drive device is configured to controllably rotate the first connection side of the arm module about the first mounting axis; or wherein the arm module is configured as a passive arm module, and wherein the first connection plate is connected to the first housing in a torque-proof manner on a side of the first housing facing away from the second connection side of the arm module.

12. The arm module according to claim 1,
wherein the arm module is configured as an active arm module, and comprising a drive device, wherein the first connection side of the arm module is rotatably mounted about the first mounting axis and is connected to the drive device in a torque-locking manner, and wherein the drive device is configured to controllably rotate the first connection side of the arm module about the first mounting axis;
wherein the first connection side of the arm module comprises a hollow shaft,
wherein the hollow shaft is torque-locked to an output side of the drive device,
wherein the hollow shaft extends through the drive device and a first axial end of the hollow shaft is connected to the first connection plate in a torque-proof manner and a second axial end of the hollow shaft is spaced apart from the drive device, and
wherein at least one fluid channel fluidically connected to the first fluid contact device and at least one electrical data connection connected to the first contact device are arranged in the hollow shaft.

13. The arm module according to claim 1, wherein the first connection plate and the first face gearing are formed integrally and of one material piece.

14. An arm module for a modular robot arm of an industrial robot, comprising:
a first housing, a first connection side, and a second connection side;
wherein the first connection side comprises a first connection plate, a first fluid contact device, and a first contact device, and the second connection side is mechanically connected to the first housing in a torque-proof manner and comprises a second connection plate,
wherein the first fluid contact device and the first contact device are arranged on the first connection plate and extend in parallel to a first mounting axis,
wherein the first connection side is connectable to a further arm module of the robot arm, and
wherein a fluid, compressed air or hydraulic fluid is transmittable via the first fluid contact device and an optical and/or electrical signal is transmittable via the first contact device for transmitting data;
wherein an external thread is circumferentially arranged around the first mounting axis on a first outer circumferential side of the first connection plate,
wherein the second connection plate is circumferentially embraced by a fastening ring, and the fastening ring comprises an internal thread on an inner circumferential side,
wherein the fastening ring is connected to a first housing of the arm module in an axially fixed manner and so as to be rotatable about a second mounting axis,
wherein a first face gearing is arranged on the first connection plate,
wherein the second connection plate includes a second face gearing,
wherein in the radial direction the first face gearing adjoins the first outer circumferential side on the inside, and
wherein the first fluid contact device is arranged radially between a first power contact device and the first face gearing;
wherein the first fluid contact device comprises a plurality of first fluid contacts arranged at an offset with respect to the first mounting axis in the circumferential direction,
wherein the first fluid contacts are arranged concentrically with regard to the first mounting axis and are configured identically to each other,
wherein the first fluid contacts are arranged on a second circular path about the first mounting axis, and
wherein the first fluid contacts are fluidically separated from each other and/or at least partially fluid-connected in parallel; and
further comprising a pin spaced apart and in parallel to the first mounting axis, wherein the pin is electrically and mechanically connected to the first connection plate and protrudes above the first connection plate;
wherein the pin is configured to engage a pin receptacle of the further arm module for encoding and/or positioning the arm module with respect to the further arm module, wherein the pin receptacle is arranged on the second circular path, and/or
wherein the second connection plate comprises a second pin receptacle, wherein the second pin receptacle is configured to correspond to the pin and is configured to receive a second pin of another arm module.

15. An arm module for a modular robot arm of an industrial robot, comprising:
a first housing, a first connection side, and a second connection side;
wherein the first connection side comprises a first connection plate, a first fluid contact device, and a first contact device, and the second connection side is mechanically connected to the first housing in a torque-proof manner and comprises a second connection plate,
wherein the first fluid contact device and the first contact device are arranged on the first connection plate and extend in parallel to a first mounting axis,
wherein the first connection side is connectable to a further arm module of the robot arm, and
wherein a fluid, compressed air or hydraulic fluid is transmittable via the first fluid contact device and an optical and/or electrical signal is transmittable via the first contact device for transmitting data;
wherein an external thread is circumferentially arranged around the first mounting axis on a first outer circumferential side of the first connection plate,
wherein the second connection plate is circumferentially embraced by a fastening ring, and the fastening ring comprises an internal thread on an inner circumferential side,
wherein the fastening ring is connected to a first housing of the arm module in an axially fixed manner and so as to be rotatable about a second mounting axis,
wherein a first face gearing is arranged on the first connection plate,
wherein the second connection plate includes a second face gearing, and
wherein a first power contact device is in radial direction with respect to the first mounting axis arranged between the first contact device and the first fluid contact device;

wherein the first power contact comprises a first power contact and at least one second power contact,
wherein the first and second power contacts are each arranged offset from one another in the circumferential direction, and
wherein the first and second power contacts are arranged concentrically on a third circular path about the first mounting axis;
wherein radially outwardly to the first power contact device, the first fluid contact device is arranged between the first power contact device and the first outer circumferential side at the first connection plate,
wherein the first fluid contact device comprises a plurality of first fluid contacts arranged at an offset with respect to the first mounting axis in the circumferential direction,
wherein the first fluid contacts are arranged concentrically with regard to the first mounting axis and are configured identically to each other,
wherein the first fluid contacts are arranged on a second circular path about the first mounting axis, and
wherein the first fluid contacts are fluidically separated from each other and/or at least partially fluid-connected in parallel; and
wherein the fluid, compressed air or hydraulic fluid is transmittable via the first fluid contact device, the optical and/or electrical signal for transmitting data is transmittable via the first contact device, and electrical power for supplying the arm module with electrical energy is transmittable via the first power contact device.

16. An arm module for a modular robot arm of an industrial robot, comprising:
a first housing, a first connection side, and a second connection side;
wherein the first connection side comprises a first connection plate, a first fluid contact device, and a first contact device, and the second connection side is mechanically connected to the first housing in a torque-proof manner and comprises a second connection plate,
wherein the first fluid contact device and the first contact device are arranged on the first connection plate and extend in parallel to a first mounting axis,
wherein the first connection side is connectable to a further arm module of the robot arm, and
wherein a fluid, compressed air or hydraulic fluid is transmittable via the first fluid contact device and an optical and/or electrical signal is transmittable via the first contact device for transmitting data;
wherein an external thread is circumferentially arranged around the first mounting axis on a first outer circumferential side of the first connection plate,
wherein the second connection plate is circumferentially embraced by a fastening ring, and the fastening ring comprises an internal thread on an inner circumferential side,
wherein the fastening ring is connected to a first housing of the arm module in an axially fixed manner and so as to be rotatable about a second mounting axis,
wherein a first face gearing is arranged on the first connection plate,
wherein the second connection plate includes a second face gearing,
wherein the second connection side comprises a second fluid contact device, a second power contact device, and a second contact device, and
wherein the second fluid contact device, the second power contact device, and the second contact device are arranged on the second connection plate, and the second fluid contact device, the second power contact device, and the second contact device extend along the second mounting axis;
wherein the arm module is configured as an active arm module, and comprising a drive device and a transfer device,
wherein the first connection side is rotatably mounted about the first mounting axis and is connected to the drive device in a torque-locking manner,
wherein the drive device is configured to controllably rotate the first connection side about the first mounting axis, and
wherein the transfer device is configured as a rotation transmitter; and
wherein the first fluid contact device is connected via the transfer device to the second fluid contact device in the first housing and the first contact device is directly or indirectly data-connected to the second contact device in the first housing for transmitting the optical and/or electrical signal,
wherein the first power contact device and the second power contact device are electrically connected via the transfer device to each other in the first housing, and
wherein the fluid, compressed air or hydraulic fluid is transmittable via the second fluid contact device, the electrical power via the second power contact device, and the optical and/or electrical signal via the second contact device.

17. A robot arm for an industrial robot comprising:
a first arm module and a second arm module,
wherein a second connection plate of the first arm module is circumferentially embraced by a fastening ring of the first arm module, and the fastening ring comprises an internal thread on an inner circumferential side,
wherein the fastening ring of the first arm module is connected to a first housing of the first arm module in an axially fixed manner and so as to be rotatable about a second mounting axis of the first arm module;
wherein a first connection plate of the second arm module includes a first face gearing,
wherein the first face gearing of the first connection plate of the second arm module comprises a plurality of first teeth that are circumferentially offset from one another,
wherein each of the first teeth includes a first tooth flank,
wherein the second connection plate of the first arm module includes a second face gearing,
wherein the second face gearing comprises a plurality of second teeth that are circumferentially offset from one another, and
wherein each of the second teeth includes a second tooth flank;
wherein the second arm module has a first housing, a first connection side, and a second connection side;
wherein the first connection side of the second arm module comprises the first connection plate of the second arm module, a first fluid contact device, and a first contact device, and the second connection side of the second arm module is mechanically connected to the first housing of the second arm module in a torque-proof manner and comprises a second connection plate of the second arm module,
wherein the first fluid contact device of the second arm module and the first contact device of the second arm module are arranged on the first connection plate of the second arm module and extend in parallel to a first mounting axis, and wherein a fluid, compressed air or hydraulic fluid is transmittable via the first fluid contact device of the second arm module and an optical and/or electrical signal is transmittable via the first contact device of the second arm module for transmitting data;

wherein an external thread is arranged circumferentially of the second arm module around the first mounting axis on a first outer circumferential side of the first connection plate of the second arm module, wherein the first face gearing of the second arm module and the second face gearing of the first arm module are formed complementary and/or corresponding to each other, wherein the fastening ring of the first arm module is screwed onto the first connection side of the second arm module in such a way that the internal thread of the fastening ring of the first arm module and an external thread of the first connection side of the second arm module engage with each other, wherein the first face gearing of the first connection plate of the second arm module and the second face gearing of the second connection plate of the first arm module engage with each other, and wherein the first tooth flank and the second tooth flank abut each other;

wherein the first connection side of the second arm module is mechanically connected to a second connection side of the first arm module for transmitting supporting forces and/or driving forces between the first arm module and the second arm module, wherein a transmission of an axial force between the first face gearing of the second arm module and the second face gearing of the first arm module takes place exclusively via the first and second tooth flanks, and wherein a transmission of a torque between the first connection side of the second arm module and the second connection side of the first arm module takes place essentially exclusively via the first and second tooth flanks; and wherein the fluid, compressed air or hydraulic fluid is transmittable for an end effector connectable to the robot arm and/or the optical and/or electrical signal is transmittable for a data transmission and for controlling the first and second arm modules, and/or the end effector is interchangeable via the mechanically connected first connection side of the second arm module and second connection side of the first arm module.

18. The robot arm according to claim 17, wherein the first face gearing and the second face gearing are configured relative to each other in such a way that the first and second face gearings are aligned centered relative to the first mounting axis when the first connection side of the second arm module is mountable to the second connection side of the first arm module by sliding the first and second face gearings adjacently to each other.

19. The robot arm according to claim 17,
wherein the second connection side of the first arm module comprises a pin receptacle,
wherein the pin receptacle is configured to align and/or encode the second connection side of the first arm module relative to the first connection side of the second arm module and is arranged in the second connection plate of the second arm module, and
wherein, in the assembled state of the first connection side of the second arm module and the second connection side of the first arm module to one another, a pin engages in the pin receptacle and electrically connects the first connection plate of the first connection side of the second arm module to the second connection plate of the second connection side of the first arm module to form a ground contact between the first and second arm modules.

20. The robot arm for an industrial robot according to claim 17,
wherein the industrial robot comprises a robot base and the first arm module comprises a first connection side,
wherein the first connection side of the first arm module faces the robot base, and
wherein the fluid, compressed air or hydraulic fluid and/or the optical and/or electrical signal is transmittable via the first connection side of the second arm module and the second connection side of the first arm module between the first connection side of the first arm module facing the robot base and the second connection side of the second arm module facing away from the robot base.

* * * * *